(12) United States Patent
Lee

(10) Patent No.: US 10,520,703 B2
(45) Date of Patent: Dec. 31, 2019

(54) OPTICAL LENS ASSEMBLY AND ELECTRONIC DEVICE INCLUDING THE SAME

(71) Applicant: Samsung Electronics Co., Ltd., Gyeonggi-do (KR)

(72) Inventor: Jeong-yeol Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/654,890

(22) Filed: Jul. 20, 2017

(65) Prior Publication Data

US 2018/0031804 A1 Feb. 1, 2018

(30) Foreign Application Priority Data

Jul. 29, 2016 (KR) .................... 10-2016-0097023

(51) Int. Cl.
| | |
|---|---|
| *G02B 9/16* | (2006.01) |
| *G02B 13/00* | (2006.01) |
| *G02B 9/36* | (2006.01) |
| *G06K 9/00* | (2006.01) |
| *G06K 9/20* | (2006.01) |

(52) U.S. Cl.
CPC ............ *G02B 13/004* (2013.01); *G02B 9/36* (2013.01); *G02B 13/0035* (2013.01); *G06K 9/00597* (2013.01); *G06K 9/00604* (2013.01); *G06K 9/209* (2013.01)

(58) Field of Classification Search
CPC .......... G02B 13/004; G02B 9/36; G02B 9/14; G02B 9/16; G06K 9/00597; G06K 9/00604; G06K 9/209
See application file for complete search history.

(56) References Cited

U.S. PATENT DOCUMENTS

| | | | | |
|---|---|---|---|---|
| 6,252,723 B1 * | 6/2001 | Nagaoka | ............... | G02B 15/173 359/652 |
| 6,940,661 B2 * | 9/2005 | Chen | ....................... | G02B 13/04 359/680 |
| 7,031,079 B2 * | 4/2006 | Isono | ....................... | G02B 9/12 359/716 |
| 7,167,323 B2 * | 1/2007 | Isono | ....................... | G02B 9/04 359/716 |
| 7,443,613 B2 | 10/2008 | Noda | | |
| 7,646,553 B2 * | 1/2010 | Isono | ....................... | G02B 9/12 359/716 |
| 8,014,084 B2 * | 9/2011 | Alon | .................. | G02B 27/0012 359/362 |

(Continued)

*Primary Examiner* — William R Alexander
*Assistant Examiner* — Balram T Parbadia
(74) *Attorney, Agent, or Firm* — Cha & Reiter, LLC.

(57) ABSTRACT

Provided are an optical lens assembly and an electronic device. The optical lens assembly includes a first lens having a positive refractive power, a second lens having a positive or negative refractive power, and a third lens having a negative refractive power. The first lens, the second lens, and the third lens are sequentially arranged from an object side to an image side of an optical axis, the object side facing an object for image capture and the image side facing an image plane of an image sensor. The optical lens assembly and the electronic device may be configured to perform, for example, iris recognition for user authentication.

16 Claims, 18 Drawing Sheets

(56) References Cited

U.S. PATENT DOCUMENTS

| | | | |
|---|---|---|---|
| 8,090,246 B2* | 1/2012 | Jelinek | G06K 9/00604 348/296 |
| 8,164,840 B2 | 4/2012 | Chen et al. | |
| 8,331,036 B2 | 12/2012 | Tang et al. | |
| 9,030,761 B2 | 5/2015 | Chen | |
| 9,465,988 B1* | 10/2016 | Marason | G06K 9/00604 |
| 2002/0060860 A1* | 5/2002 | Murata | G02B 15/177 359/751 |
| 2004/0021957 A1* | 2/2004 | Isono | G02B 9/16 359/791 |
| 2004/0196575 A1* | 10/2004 | Nozawa | G02B 9/12 359/791 |
| 2007/0109668 A1* | 5/2007 | Isono | G02B 9/12 359/791 |
| 2009/0141140 A1* | 6/2009 | Robinson | G02B 13/0025 348/222.1 |
| 2010/0110275 A1* | 5/2010 | Mathieu | A61B 5/1171 348/360 |
| 2010/0172024 A1* | 7/2010 | Sakagami | G02B 9/34 359/570 |
| 2011/0115965 A1* | 5/2011 | Engelhardt | G02B 13/004 348/345 |
| 2013/0044378 A1* | 2/2013 | Yin | G02B 13/004 359/715 |
| 2014/0184875 A1* | 7/2014 | Ahn | G02B 13/0035 348/335 |
| 2014/0184880 A1* | 7/2014 | Ahn | G02B 13/004 348/342 |
| 2015/0029600 A1* | 1/2015 | Kim | G02B 13/0035 359/716 |
| 2015/0116843 A1* | 4/2015 | Jo | G02B 13/0045 359/713 |
| 2015/0168691 A1* | 6/2015 | Lee | G02B 13/004 359/570 |
| 2015/0177483 A1* | 6/2015 | You | G02B 9/62 359/757 |
| 2015/0362700 A1* | 12/2015 | Prabhakar | A61B 5/1171 348/78 |
| 2016/0044253 A1* | 2/2016 | Dainty | G02B 5/3025 348/349 |
| 2016/0092731 A1* | 3/2016 | Dainty | G06K 9/00604 348/78 |
| 2016/0116713 A1* | 4/2016 | Hsu | G02B 13/0035 348/335 |
| 2016/0170185 A1* | 6/2016 | Kim | G02B 13/0065 359/729 |

* cited by examiner

OPTICAL LENS ASSEMBLY AND ELECTRONIC DEVICE INCLUDING THE SAME

CLAIM OF PRIORITY

This application claims the benefit of Korean Patent Application No. 10-2016-0097023, filed on Jul. 29, 2016, in the Korean Intellectual Property Office, the disclosure of which is incorporated herein in its entirety by reference.

BACKGROUND

1. Field

The present disclosure generally relates to optical lens assemblies and electronic devices including such optical lens assemblies, and more particularly, to optical lens assemblies that are small in size while also having excellent optical performance, and electronic devices including such optical lens assemblies.

2. Description of the Related Art

Camera technology has greatly advanced in recent years so that cameras are no longer stand-alone cameras, but rather components of a variety of ubiquitous electronic devices (apparatuses) such as mobile devices, home appliances, or other user devices. With the wide use of these electronic devices, utilization of the camera as a part of these electronic devices is increasing. Accordingly, in response to user demand, camera performance and/or resolution in electronic devices are being improved. Various kinds of landscapes, people, or self-shot pictures of "selfies" may be captured by the camera. In addition, network connectivity of the electronic device allows multimedia, for example, pictures or videos, to be shared on social networks or via other media.

In mobile electronic devices, front facing cameras are mainly used to make video calls or take selfies. The front facing camera can also capture images of the user for use in iris recognition, where recognized iris patterns may be used to authenticate the user to unlock the device Thus, front facing cameras generally have a viewing angle of 60° or greater so that the entire face of the user may be photographed when the user is holding the device about 20 cm to 50 cm from his or her person, which is about the general arm length of human beings. In this case, although the entire face may be captured by the image sensor of the camera, iris size in the captured image may be reduced due to the wide viewing angle. Accordingly, the iris pattern image may also be reduced. Smaller iris pattern images make iris recognition more difficult.

SUMMARY

Provided are optical lens assemblies capable of recognizing the iris of the user of an electronic device, e.g., a mobile terminal.

Provided are electronic devices including an optical lens assembly capable of recognizing the iris of the user.

Additional aspects will be set forth in part in the following description, will be apparent from the description, or may be learned by practice of the presented embodiments.

According to an aspect of an embodiment, an optical lens assembly includes a first lens having a positive refractive power; a second lens having a refractive power; and a third lens having a negative refractive power, wherein the first lens, the second lens, and the third lens are sequentially arranged from an object side to an image side of an optical axis, the object side facing an object for image capture and the image side facing an image plane of an image sensor, and the optical lens assembly satisfies the following condition:

$$0.7 \leq OAL/EFL \leq 1.2,$$

where OAL denotes an entire length of the optical lens assembly, and EFL denotes an effective focal distance of the optical lens assembly.

According to an aspect of an embodiment, an optical lens assembly includes a first lens, a second lens, a third lens, and a visible light cut-off filter, wherein the first lens, the second lens, and the third lens are sequentially arranged from an object side to an image side of an optical axis, the object side facing an object for image capture and the image side facing an image plane of an image sensor, and the optical lens assembly satisfies the following condition:

$$0.4 \leq T13/OAL \leq 0.8,$$

where T13 denotes a distance from an object side surface of the first lens to an image side surface of the third lens, and OAL denotes an entire length of the optical lens assembly.

According to an aspect of an embodiment, an electronic device includes: an optical lens assembly configured to focus an image of an object; and an image sensor configured to receive light focused by the optical lens assembly, wherein the optical lens assembly includes a first lens having a positive refractive power, a second lens having a positive or negative refractive power, and a third lens having a negative refractive power, the first lens, the second lens, and the third lens are sequentially arranged from an object side to an image side of an optical axis, the object side facing an object for image capture and the image side facing an image plane of an image sensor, and the optical lens assembly satisfies the following condition $$0.7 \leq OAL/EFL \leq 1.2,$$

where OAL denotes an entire length of the optical lens assembly, and EFL denotes an effective focal distance of the optical lens assembly.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
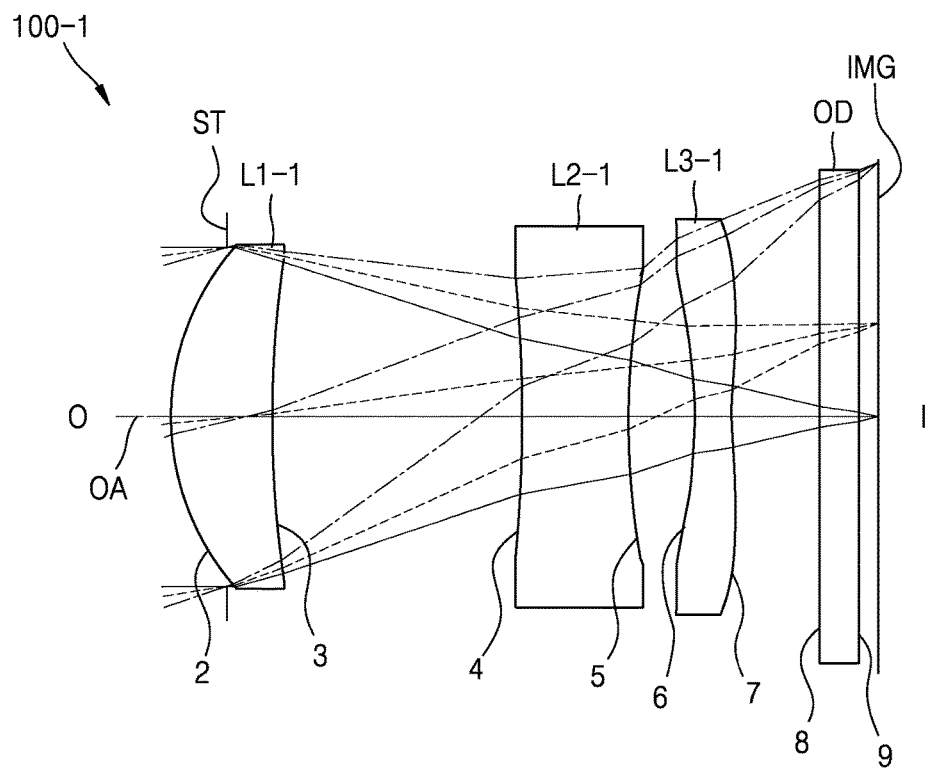
FIG. 1 is a diagram of an optical lens assembly of the first numerical example of the present disclosure.

Hereinafter, one or more embodiments of the present disclosure will be described below with reference to accompanying drawings. However, the techniques disclosed in the present disclosure are not limited to the disclosed embodiments, but it should be appreciated that various modifications, equivalents, and/or alternatives of the embodiments may be implemented. Regarding the description of the drawings, like reference numerals may be used for like components.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B," "at least one of A and/or B," or "one or more of A and/or B" includes any and all combinations of one or more of the associated listed items. For examples, "A or B," "at least one of A and B," "at least one of A or B" each may include (1) at least one A, or include (2) at least one B, or include (3) both at least one A and at least one B.

Ordinal numbers as herein used, such as "first," "second," etc., may modify various components of various exemplary embodiments, but do not limit those components. For example, these terms do not limit the order and/or importance of the components. These terms are only used to distinguish one component from another. For example, a first user device and a second user device are different user devices from each other. For example, according to various exemplary embodiments of the present disclosure, a first component may be denoted a second component, and vice versa without departing from the scope of the present disclosure.

When a component (e.g., a first component) is "(operatively or communicatively) connected to or coupled to" another component (a second component), the component may be directly connected or coupled to the other component, or other component(s) (e.g., a third component) may intervene therebetween. In contrast, when a component (e.g., a first component) is directly "connected to" or "directly coupled to" another component (e.g., a second component), no other intervening components (e.g., a third component) may intervene therebetween.

The expression "configured to" used in the present disclosure may be exchanged with, for example, "suitable for," "having the capacity to," "designed to," "adapted to," "made to," or "capable of" depending on the context of the disclosure. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms as used in various exemplary embodiments of the present disclosure are merely for the purpose of describing particular embodiments and are not intended to limit the present disclosure to the various exemplary embodiments. As used herein, the singular forms are intended to include the plural forms as well, unless the context clearly indicates otherwise. Unless defined otherwise, all terms used herein, including technical terms and scientific terms, have the same meaning as commonly understood by a person of ordinary skill in the art to which various exemplary embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in the present disclosure. In some cases, even the term defined in the disclosure should not be interpreted to exclude embodiments of the disclosure.

An electronic device according to various exemplary embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various exemplary embodiments, the wearable device may include, for example, at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like.

According to some exemplary embodiments, the electronic device may, for example, be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another exemplary embodiment, the electronic device may include, for example, at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some exemplary embodiments, the electronic device may include, for example, at least one of a part of furniture or a building/structure, an electronic board, an electronic signature receiving device, a projector, and various kinds of measuring instruments (e.g., a water meter, an electric meter, a gas meter, and a radio wave meter). The electronic device according to various exemplary embodiments of the disclosure may, for example, be a combination of one or more of the aforementioned various devices. The electronic device according to some exemplary embodiments of the disclosure may be a flexible device, or the like. Further, the electronic device according to an exemplary embodiment of the disclosure is not limited to the aforementioned devices, and may include a new electronic device according to the development of technology.

An electronic device according to various exemplary embodiments will be described with reference to the accompanying drawings. As used herein, the term "user" may indicate a person who uses an electronic device or a device (e.g., an artificial intelligence electronic device) that uses an electronic device.

As used herein, the term "and/or" includes any and all combinations of one or more of the associated listed items. Expressions such as "at least one of," when preceding a list of elements, modify the entire list of elements and do not modify the individual elements of the list.

Hereinafter, an optical lens assembly and a device including the optical lens assembly according to various exemplary embodiments will be described with reference to accompanying drawings.

An optical lens assembly according to various exemplary embodiments may include three or more lenses.

FIG. 1 is a diagram of an optical lens assembly 100-1 of the first numerical example of the present disclosure.

The optical lens assembly 100-1 may include a first lens L1-1, a second lens L2-1, and a third lens L3-1 arranged from an object side O towards an image side I.

Hereinafter, when components of each lens are described, the image side I may denote the side towards the image plane IMG in which the image is focused and the object side O may denote the side towards the object whose image is to be captured. In addition, "object side surface" of a lens denotes the lens surface closer to the object, that is, the left surface on the drawings, and an "image side surface" of the lens denotes the lens surface closer to the image plane IMG, that is, the right surface on the drawings. The image plane IMG may be, for example, an imaging device surface or an image sensor surface. An image sensor may be, for example, a sensor such as a complementary metal oxide semiconductor (CMOS) image sensor or a charge coupled device (CCD). The image sensor is not limited thereto and may be, for example, any device that converts an image of an object into an electric image signal.

According to the one exemplary embodiment, the first lens L1-1 may have positive refractive power. Further, the first lens L1-1 may have an object side surface 2 that is convex towards the object side O. The first lens L1-1 may be a meniscus lens that is convex towards the object side O.

According to one exemplary embodiment, the second lens L2-1 may have positive refractive power or negative refractive power. The second lens L2-1 may have an object side surface 4 that is centrally concave toward the object side O, i.e. the object side surface 4 is concave towards the object side O in a region adjacent to the optical axis OA. The second lens L2-1 may have an image side surface 5 that is centrally convex toward the image side I in the region adjacent to the optical axis OA.

According to one exemplary embodiment, the third lens L3-1 may have negative refractive power. The third lens L3-1 may have an object side surface 6 that is centrally concave toward the object side O in the region adjacent to the optical axis OA. The third lens L3-1 may have an image side surface 7 that is centrally concave toward the image side I in the region adjacent to the optical axis OA. The region adjacent to the optical axis may denote a region within a predetermined range from the optical axis. According to one exemplary embodiment, the third lens L3-1 may have at least one inflection point. An inflection point may refer to a point at which the sign of the radius of curvature of the lens surface changes from positive (+) to negative (−), or from negative (−) to positive (+). Alternatively, the inflection point may refer to a point at which the shape of the lens changes from convex to concave, or from concave to convex.

The optical lens assembly according to one exemplary embodiment may include an aperture stop ST. The aperture stop ST may adjust the aperture of the camera, and may include, for example, an opening stop, a variable stop, or a mask type stop. The aperture stop ST may be disposed, for example, on the object side surface 2 of the first lens L1-1. When the aperture stop is disposed on the object side surface 2 of the first lens L1-1, the effective size of the aperture or window may be reduced by user selection. The aperture or the window may be a hole formed by the aperture stop ST so that light may enter the optical lens assembly.

However, a location of the aperture stop is not limited thereto, and the aperture stop ST may be disposed, for example, between the first lens L1-1 and the second lens L2-1.

The optical lens assembly according to one exemplary embodiment may include at least one aspherical lens. For example, the first lens L1-1, the second lens L2-1, and the third lens L3-1 may each include at least one aspherical surface. As another example, the first lens L1-1, the second lens L2-1, and the third lens L3-1 may each include double aspherical surfaces.

At least one optical device OD may be disposed between the third lens L3-1 and the image plane IMG. The optical device OD may be, for example, a visible light cut-off filter and a cover glass. When the visible light cut-off filter is provided as the optical device OD, the visible light may be blocked and infrared ray may be transmitted to the image plane IMG. The visible light cut-off filter may include a material for absorbing visible light or may be manufactured by coating a blocking or reflecting material that blocks visible light on a glass plate.

Figure 3:
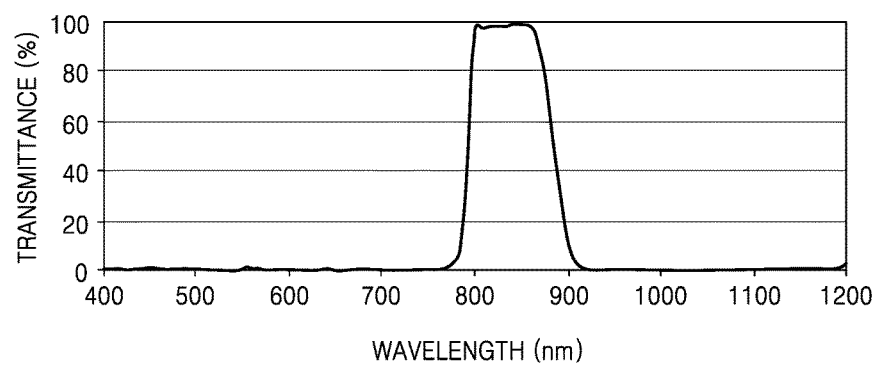
FIG. 3 is a graph showing transmittance of a visible ray blocking filter adopted in the optical lens assembly versus wavelength, according to one embodiment of the present disclosure.

FIG. 3 is a graph showing transmittance of a visible light cut-off filter versus wavelength. In this case, the visible light cut-off filter is coated with a material that reflects visible light. The visible light cut-off filter transmits very little visible light within the wavelength range of 450 nm to 780 nm. As shown in FIG. 3, transmittance of visible light in this wavelength range may be 10% or less. However, in the wavelength range of 780 nm to 900 nm, the visible light cut-off filter may transmit a relatively higher percentage of visible light.

Therefore, the optical lens assembly according to the one exemplary embodiment may block visible light at a specific wavelength range and instead transmit infrared light to the image plane IMG.

Figure 4:
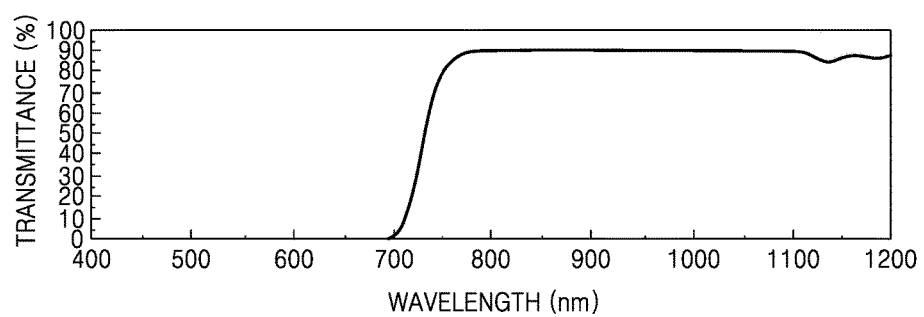
FIG. 4 is a graph showing transmittance of a visible ray absorbing material included in the optical lens assembly versus wavelength, according to one embodiment of the present disclosure.

FIG. 4 is a graph showing transmittance of a visible light cut-off filter versus wavelength. In this case, the visible light cut-off filter includes a material for absorbing visible light. As shown in the figure, transmittance of visible light in the 400 nm to 700 nm wavelength range is relatively low, while transmittance of light in the 700 nm or greater range is relatively high.

During iris recognition, the camera detects infrared light reflected from the iris as well as visible light reflected from the corneas of the eye. Reflectivity of visible light from the cornea may be high, which may obscure the infrared iris image. Therefore, it may be advantageous to block visible light, at least at certain wavelength ranges, by the visible light cut-off filter, so that the iris image may be obtained more precisely.

Figure 5:
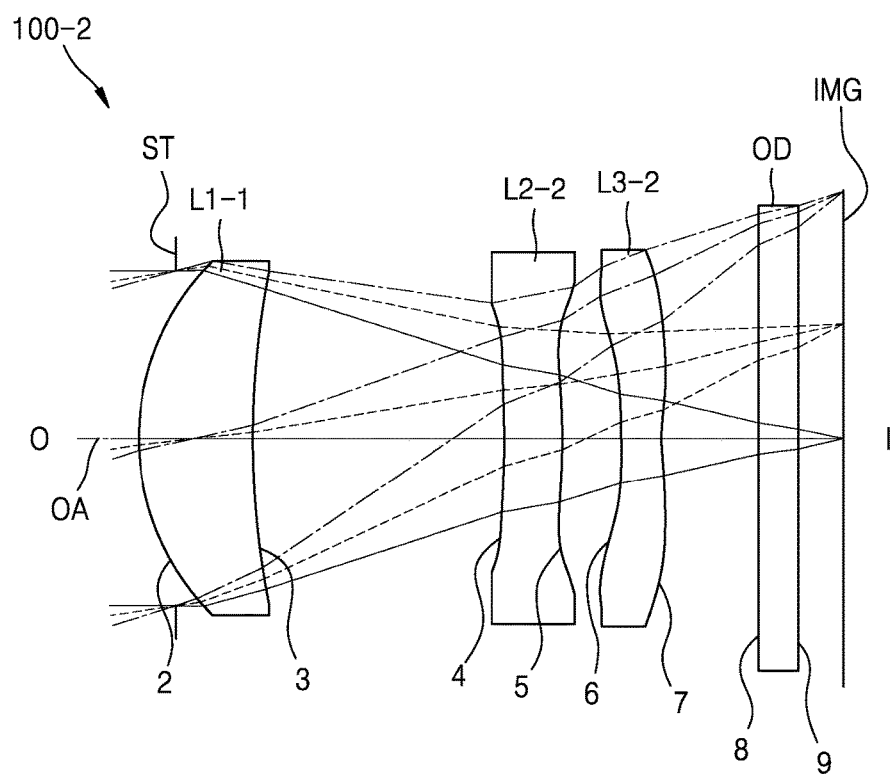
FIG. 5 is a diagram of an optical lens assembly of the second numerical example of the present disclosure.

FIG. 5 is a diagram of an optical lens assembly 100-2 of the second numerical example of the present disclosure.

According to one exemplary embodiment, the optical lens assembly 100-2 may include a first lens L1-2 having positive refractive power, a second lens L2-2 having positive or negative refractive power, and a third lens L3-2 having negative refractive power. The optical device OD may be disposed between the third lens L3-2 and the image plane IMG. In the descriptions of the second numerical example, descriptions about components similar to those of the first numerical example will be omitted.

Figure 7:
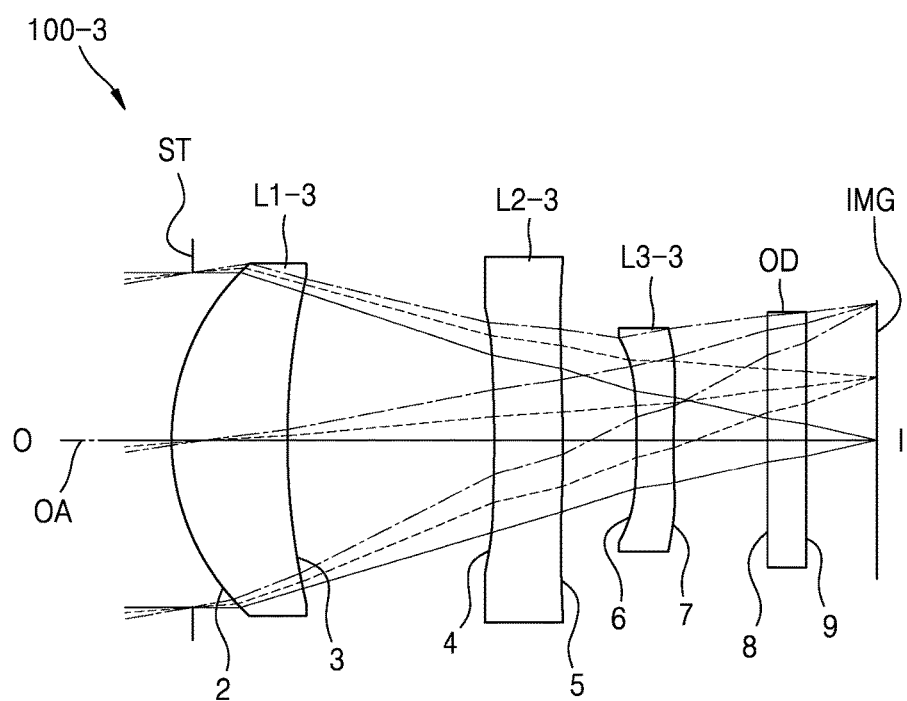
FIG. 7 is a diagram of an optical lens assembly of the third numerical example of the present disclosure.

FIG. 7 is a diagram of an optical lens assembly 100-3 of the third numerical example of the present disclosure.

According to one exemplary embodiment, the optical lens assembly 100-3 may include a first lens L1-3 having positive refractive power, a second lens L2-3 having positive or negative refractive power, and a third lens L3-3 having negative refractive power. The optical device OD may be disposed between the third lens L3-3 and the image plane IMG. In the descriptions of the third numerical example, descriptions about components similar to those of the first numerical example will be omitted.

Figure 9:
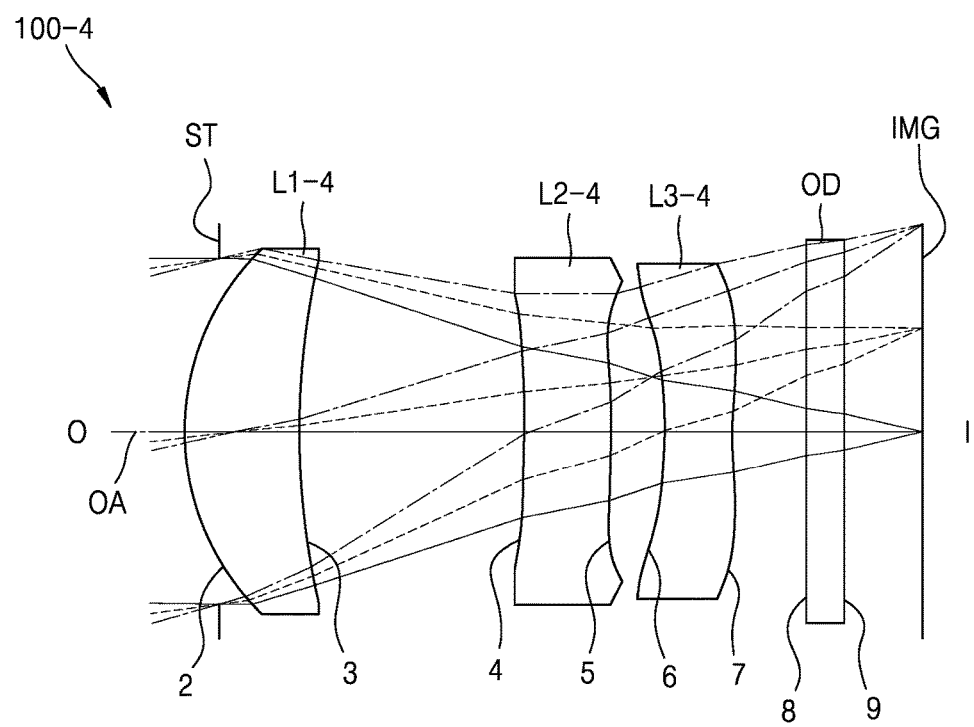
FIG. 9 is a diagram of an optical lens assembly of the fourth numerical example of the present disclosure.

FIG. 9 is a diagram of an optical lens assembly 100-4 of the fourth numerical example of the present disclosure.

According to one exemplary embodiment, the optical lens assembly 100-4 may include a first lens L1-4 having positive refractive power, a second lens L2-4 having positive or negative refractive power, and a third lens L3-4 having negative refractive power. The optical device OD may be disposed between the third lens L3-4 and the image plane IMG. In the descriptions of the fourth numerical example, descriptions about components similar to those of the first numerical example will be omitted.

Figure 11:
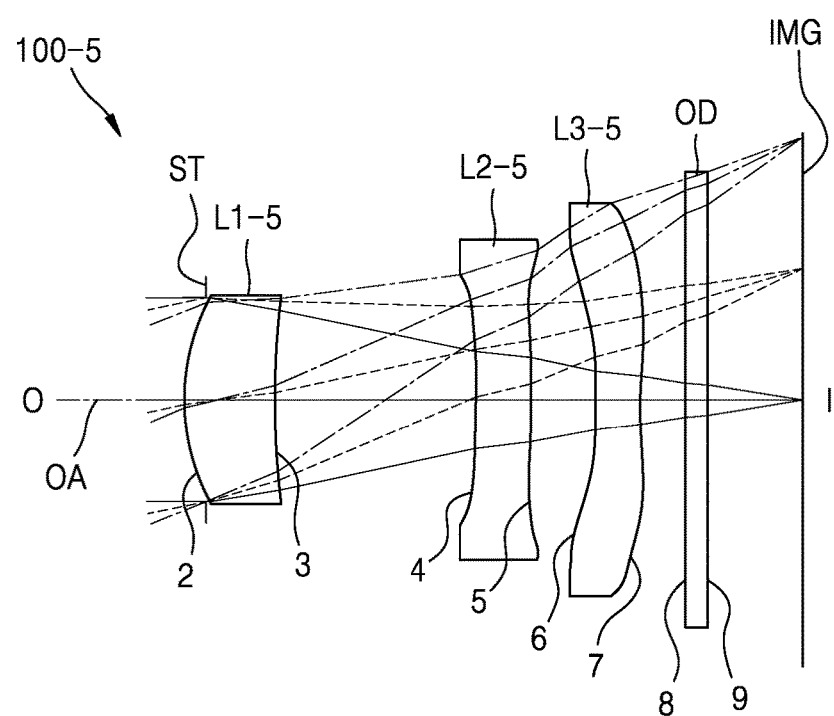
FIG. 11 is a diagram of an optical lens assembly of the fifth numerical example of the present disclosure.

FIG. 11 is a diagram of an optical lens assembly 100-5 of the fifth numerical example of the present disclosure.

According to one exemplary embodiment, the optical lens assembly 100-5 may include a first lens L1-5 having positive refractive power, a second lens L2-5 having positive or negative refractive power, and a third lens L3-5 having negative refractive power. The optical device OD may be disposed between the third lens L3-5 and the image plane IMG. In the descriptions of the fifth numerical example, descriptions about components similar to those of the first numerical example will be omitted.

The optical lens assembly according to the various exemplary embodiments may satisfy following conditions. Conditions below will be described with reference to the optical lens assembly 100-1 according to the first numerical example shown in FIG. 1. However, the following conditions may be applied to the other numerical examples.

$$0.7 \leq OAL/EFL \leq 1.2 \tag{1-1}$$

Here, OAL denotes the entire length of the optical lens assembly, and EFL denotes the effective focal length of the optical lens assembly. The entire length OAL of the optical lens assembly may be the distance from the object side surface 2 of the first lens to the image plane IMG.

The optical lens assembly according to the various exemplary embodiments may also satisfy following condition.

$$0.8 \leq OAL/EFL \leq 1.1 \tag{1-2}$$

The optical lens assembly according to the various exemplary embodiments may also satisfy following condition.

$$0.8 \leq OAL/EFL \leq 1.0 \tag{1-3}$$

When (OAL/EFL) satisfies condition 1-1, 1-2, or 1-3, the optical lens assembly may be miniaturized so that the space the optical lens assembly takes up in the electronic device is minimized. At the same time, the iris of the user may be precisely photographed.

The optical lens assembly according to the various exemplary embodiments may also satisfy following condition.

$$0.5 \leq A11/A32 \leq 1.1 \tag{2}$$

Here, A11 denotes the effective size of the object side surface of the first lens, and A32 denotes the effective size of the image side surface of the third lens.

When (A11/A32) is less than 0.5, the effective size of the object side surface of the first lens may be too small. As a result, the optical lens assembly may not accept sufficient amount of light, and thus the captured image may be too dark. Conversely, when (A11/A32) is greater than 1.1, the first lens may be too big, such that the optical lens assembly is unnecessarily large.

The optical lens assembly according to the various exemplary embodiments may also satisfy following condition.

$$0.39 \leq A11/IMH \leq 1.28 \tag{3}$$

Here, A11 denotes the effective size of the object side surface of the first lens, and IMH denotes the image height. The image height may be the diagonal length of the image sensor.

The optical lens assembly according to the various exemplary embodiments may have a transverse magnification within a range of 0.01 to 0.4 when an object distance is approximately 20 cm.

Figure 13:
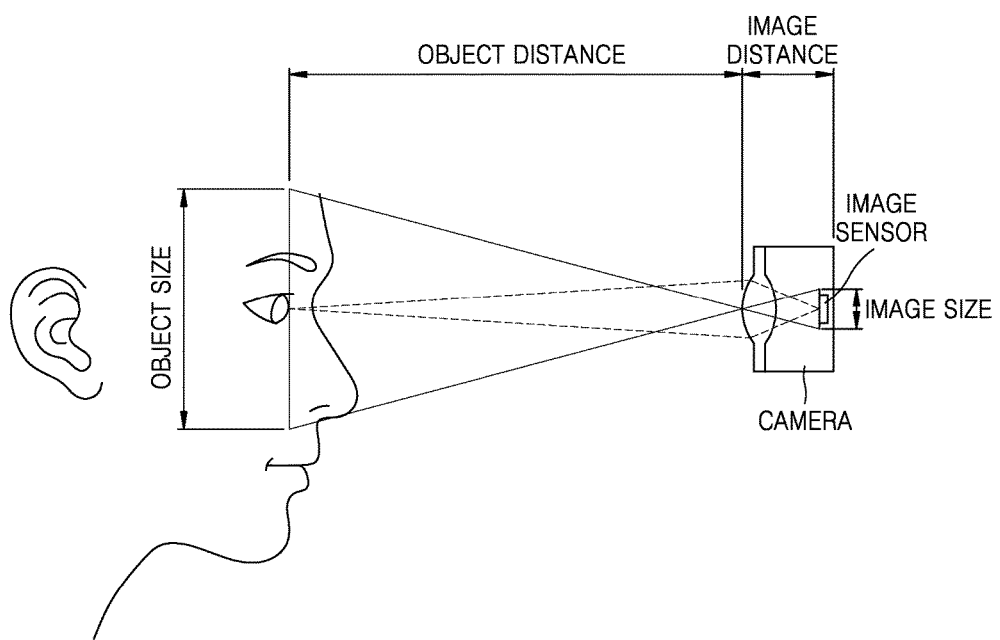
FIG. 13 is a lateral diagram of an optical lens assembly according to one exemplary embodiment of the present disclosure.

FIG. 13 is a lateral diagram showing transverse magnification according to one embodiment. Referring to FIG. 13, the object distance is the distance from an object whose image is to be captured to the object side surface of the first lens. An image distance denotes sum of a focal distance and a moved distance of the image plane according to the object distance. The transverse magnification is a ratio between the object distance and the image distance. For example, when a user uses the camera for iris recognition, the user may be 20 cm to 50 cm away from the camera, which the distance that is typically between the user and the electronic device when the device is in use. During iris recognition, the transverse magnification may be the ratio between the image distance (i.e. the distance between the object side surface of a first lens to the image sensor or the image plane IMG) and the object distance (i.e. the distance from the eye of the user to the camera to an object side surface of the first lens). If the transverse magnification is excessively small, the iris image on the image plane may be accordingly too small for effective iris recognition.

The optical lens assembly according to the various embodiments may have a transverse magnification ranging from 0.004 to 0.015 when, for example, the object distance of 50 cm.

For example, when the object distance is 20 cm, the optical lens assembly may have a focal distance of 2.2 mm or greater in order for the transverse magnification to have a value of 0.01 or greater. But when the focal distance is too large, viewing angle of the lens assembly is reduced, and therefore it would be difficult to capture both eyes of the user at the object distance of 20 cm. Therefore, the focal distance may be limited to 7.0 mm or less so that both eyes may be within the viewing angle of the camera. Therefore, the optical lens assembly according to various exemplary embodiments may have the focal distance EFL ranging from 2.2 mm to 7.0 mm. In addition, the optical lens assembly according to various exemplary embodiments may have the entire length OAL ranging from 2.1 mm to 6.8 mm in order to minimize the size of the lens assembly.

The optical lens assembly according to the various exemplary embodiments may also satisfy following condition.

$$0.75 \leq f1/EFL \leq 0.9 \quad (4)$$

$$0.7 \leq |f3/EFL\ 1| \leq 1.1 \quad (5)$$

Here, f1 denotes a focal distance of the first lens, and EFL denotes the effective focal distance of the optical lens assembly. Further, f3 denotes a focal distance of the third lens, and "1 f3/EFL 1" denotes the absolute value of "f3/EFL," i.e. the magnitude of "f3/EFL" without regard to its sign.

The optical lens assembly according to the various exemplary embodiments may also satisfy following condition.

$$0.19 \leq R1/OAL \leq 0.36 \quad (6)$$

Here, R1 denotes the radius of curvature of the object side surface of the first lens, and OAL denotes the entire distance of the optical lens assembly. When (R1/OAL) is less than 0.19, the radius of curvature of the first lens is too small such as aberrations may be introduced during manufacture. When (R1/OAL) is greater than 0.36, the radius of curvature of the first lens is too large and it may be difficult to miniaturize the first lens.

The optical lens assembly according to the various exemplary embodiments may also satisfy following condition.

$$0.4 \leq T13/OAL \leq 0.8 \quad (7\text{-}1)$$

Here, T13 denotes the distance from the object side surface 2 of the first lens to the image side surface 7 of the third lens, and OAL denotes the entire length of the optical lens assembly.

When (T13/OAL) is less than 0.4, the relatively low value of T13 allows for wider viewing angle, and it may be difficult to obtain the desired magnification. When (T13/OAL) is greater than 0.8, the relatively large value of T13 may make miniaturization of the lens assembly difficult. In addition, the relatively large value of T13 may decrease the viewing angle.

$$0.45 \leq T13/OAL \leq 0.75 \quad (7\text{-}2)$$

$$0.49 \leq T13/OAL \leq 0.7 \quad (7\text{-}3)$$

When the value of (T13/OAL) satisfies Condition 7-1, 7-2, or 7-3, the optical lens assembly may be properly miniaturized, and any aberration in the lens assembly may be more easily corrected.

The optical lens assembly may be used in user authentication via iris recognition method disclosed above. Iris recognition is one of biometric techniques used for user authentication, based on the fact that users have unique iris patterns. When used for iris recognition, the viewing angle and/or focal length of the optical lens assembly have to be wide enough or long enough to ensure photography of both eyes of the user at arm's length of the user. Doing so allows the electronic device to perform iris recognition during normal operations of the electronic device. Accordingly, the user is not inconvenienced by having to hold the electronic device in a particular way in order for the electronic device to perform iris recognition. In addition, the irises of humans reflect relatively large amounts of infrared light, and the corneas reflect relatively large amounts of visible light. Therefore, when the user is photographed for iris authentication, the iris image may be obscured by the light reflected from the cornea, which renders iris recognition more difficult. To remedy this, the optical lens assembly according to various exemplary embodiments may block visible light at certain wavelength ranges so that iris images can be more easily captured.

The aspherical surface used in the optical lens assembly according to various exemplary embodiments may be defined as follows.

The aspherical surface shape may be defined by following condition, where the optical axis OA is the x-axis, a direction perpendicular to the optical axis OA is the y-axis, and the light ray entering the lens assembly proceeds in the positive x-direction. Here, x denotes a distance from the vertex of the lens along the optical axis OA, y denotes the distance in the direction perpendicular to the optical axis OA, K denotes a conic constant, A, B, C, D, . . . denote aspherical coefficients, and c denotes a reciprocal number of the radius of curvature (1/R) at the vertex of the lens.

$$x = \frac{cy^2}{1 + \sqrt{1-(K+1)c^2y^2}} + Ay^4 + By^6 + Cy^8 + Dy^{10} + \ldots \quad (8)$$

Various numerical values of the optical lens assembly may be adjusted according to various designs as follows.

In each of the numerical examples, the lens surfaces (1, 2, 3 . . . n: where n is a natural integer) are numbered sequentially from the object side O to the image side I. OAL denotes the entire length of the optical lens assembly, EFL denotes the effective focal distance of the optical lens assembly, R denotes the radius of curvature, Dn denotes the thickness of the lens or the air space between lenses, Nd denotes the refractive index, and Vd denotes the Abbe's number. ST denotes the aperture stop, and * denotes that the surface is an aspherical surface.

FIRST NUMERICAL EXAMPLE

FIG. 1 is a diagram of an optical lens assembly of a first numerical example of the present disclosure, and Table 1 shows the design data for the first numerical example.

TABLE 1

| lens surface | R (mm) | Dn (mm) | Nd | Vd | effective diameter (mm) |
|---|---|---|---|---|---|
| ST | Infinity | −0.290 | | | 1.78 |
| 2* | 1.34 | 0.524 | 1.525 | 56.3 | 1.81 |
| 3* | 6.81 | 1.335 | | | 1.74 |
| 4* | −34.32 | 0.562 | 1.622 | 23.5 | 1.46 |
| 5* | −27.07 | 0.349 | | | 1.56 |
| 6* | −10.17 | 0.200 | 1.618 | 31.2 | 1.87 |
| 7* | 2.03 | 0.470 | | | 2.07 |
| 8 | Infinity | 0.210 | 1.516 | 54.5 | 2.48 |

TABLE 1-continued

| lens surface | R (mm) | Dn (mm) | Nd | Vd | effective diameter (mm) |
|---|---|---|---|---|---|
| 9 | Infinity | 0.115 | | | 2.59 |
| IMH | Infinity | -0.015 | | | 2.67 |

Table 2 illustrates aspherical coefficients in the first numerical example.

TABLE 2

| aspherical coefficients | 2* | 3* | 4* | 5* | 6* | 7* |
|---|---|---|---|---|---|---|
| R | 1.345E+00 | 6.812E+00 | -3.432E+01 | -2.707E+01 | -1.017E+01 | 2.032E+00 |
| K | 1.926E-02 | 2.966E+01 | 8.403E+01 | 6.986E+01 | 9.523E+01 | 0.000E+00 |
| A | -1.446E-02 | 4.096E-04 | 1.131E-01 | 1.144E-01 | -1.123E+00 | -1.335E+00 |
| B | 3.562E-02 | 3.566E-02 | -1.865E+00 | 6.225E-01 | 4.074E+00 | 4.446E+00 |
| C | -1.730E-01 | -1.041E-01 | 1.359E+01 | -3.375E+00 | -9.095E+00 | -1.141E+01 |
| D | 5.071E-01 | 1.402E-01 | -5.880E+01 | 1.698E+01 | 1.549E+01 | 2.077E+01 |
| E | -9.339E-01 | -7.414E-02 | 1.485E+02 | -4.851E+01 | -1.899E+01 | -2.557E+01 |
| F | 1.014E+00 | -3.030E-03 | -2.192E+02 | 7.734E+01 | 1.578E+01 | 1.987E+01 |
| G | -5.854E-01 | 1.522E-02 | 1.733E+02 | -6.575E+01 | -7.971E+00 | -8.708E+00 |
| H | 1.385E-01 | -3.663E-03 | -5.694E+01 | 2.318E+01 | 1.826E+00 | 1.626E+00 |

Values under Conditions 1 to 7 in the first numerical example are as follows.
OAL=3.75 mm
EFL=3.88 mm
Transverse magnification (object distance 20 cm)=0.02
Transverse magnification (object distance 50 cm)=0.008
f1/EFL=0.796
1 f3/EFL 1=0.702
OAL/EFL=0.966
R1/EFL=0.347
A11/IMH=0.667
A11/A32=0.859
T13/OAL=0.599

Figure 2:
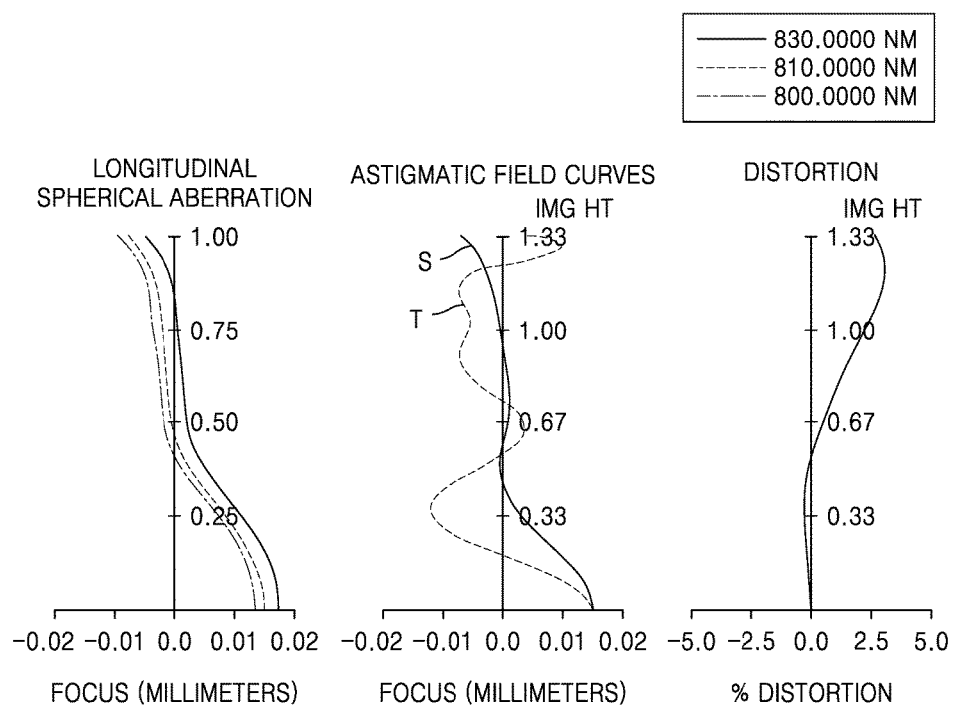
FIG. 2 is an aberration diagram of the optical lens assembly of the first numerical example of the present disclosure.

FIG. 2 shows the longitudinal spherical aberration, the astigmatic field curves, and the distortion of the optical lens assembly according to the first numerical example of the present disclosure. The longitudinal spherical aberration is shown with respect to light at the wavelengths of 830.0000 NM (nanometer), 810.0000 NM, and 800.0000 NM. The tangential field curvature (T) and the sagittal field curvature (S) are shown in the astigmatic field curves. The astigmatic field curves are shown with respect to light at the wavelength of 810.0000 NM, and the distortion is shown with respect to light at the wavelength of 810.00008 NM.

SECOND NUMERICAL EXAMPLE

FIG. 5 shows an optical lens assembly of the second numerical example of the present disclosure, and Table 3 shows the design data for the second numerical example.

TABLE 3

| lens surface | R (mm) | Dn (mm) | Nd | Vd | effective diameter (mm) |
|---|---|---|---|---|---|
| ST | Infinity | -0.200 | | | 1.80 |
| 2* | 1.33 | 0.602 | 1.538 | 56.0 | 1.91 |
| 3* | 5.13 | 1.339 | | | 1.78 |
| 4* | -8.12 | 0.304 | 1.538 | 56.0 | 1.44 |

TABLE 3-continued

| lens surface | R (mm) | Dn (mm) | Nd | Vd | effective diameter (mm) |
|---|---|---|---|---|---|
| 5* | -7.15 | 0.316 | | | 1.63 |
| 6* | -9.20 | 0.219 | 1.538 | 56.0 | 1.84 |
| 7* | 2.41 | 0.513 | | | 2.02 |
| 8 | Infinity | 0.210 | 1.516 | 54.5 | 2.41 |
| 9 | Infinity | 0.250 | | | 2.50 |
| IMH | Infinity | -0.010 | | | 2.67 |

Table 4 illustrates aspherical coefficients in the second numerical example.

TABLE 4

| aspherical coefficients | 2* | 3* | 4* | 5* | 6* | 7* |
|---|---|---|---|---|---|---|
| R | 1.325E+00 | 5.133E+00 | -8.124E+00 | -7.149E+00 | -9.199E+00 | 2.408E+00 |
| K | -9.500E-03 | 1.760E+01 | 8.403E+01 | 6.986E+01 | 9.523E+01 | 0.000E+00 |
| A | -7.001E-03 | -4.024E-03 | -5.284E-02 | -3.576E-02 | -1.101E+00 | -1.117E+00 |
| B | -2.857E-02 | 2.175E-02 | -1.351E-01 | 7.162E-01 | 2.993E+00 | 3.041E+00 |
| C | 1.255E-01 | -1.063E-01 | 2.623E+00 | 1.153E+00 | -3.732E+00 | -6.656E+00 |
| D | -3.369E-01 | 2.432E-01 | -1.248E+01 | -8.606E+00 | 6.894E-01 | 1.037E+01 |
| E | 4.901E-01 | -3.113E-01 | 2.754E+01 | 2.271E+01 | 6.242E+00 | -1.072E+01 |
| F | -3.692E-01 | 2.010E-01 | -3.178E+01 | -2.866E+01 | -8.412E+00 | 6.485E+00 |
| G | 1.124E-01 | -5.022E-02 | 1.381E+01 | 1.360E+01 | 3.369E+00 | -1.706E+00 |

Values under Conditions 1 to 7 in the second numerical example are as follows.
OAL=3.74 mm
EFL=3.94 mm
Transverse magnification (object distance 20 cm)=0.020
Transverse magnification (object distance 50 cm)=0.008
f1/EFL=0.799
1 f3/EFL 1=0.895
OAL/EFL=0.950
R1/EFL=0.336
A11/IMH=0.675
A11/A32=0.890
T13/OAL=0.523

Figure 6:
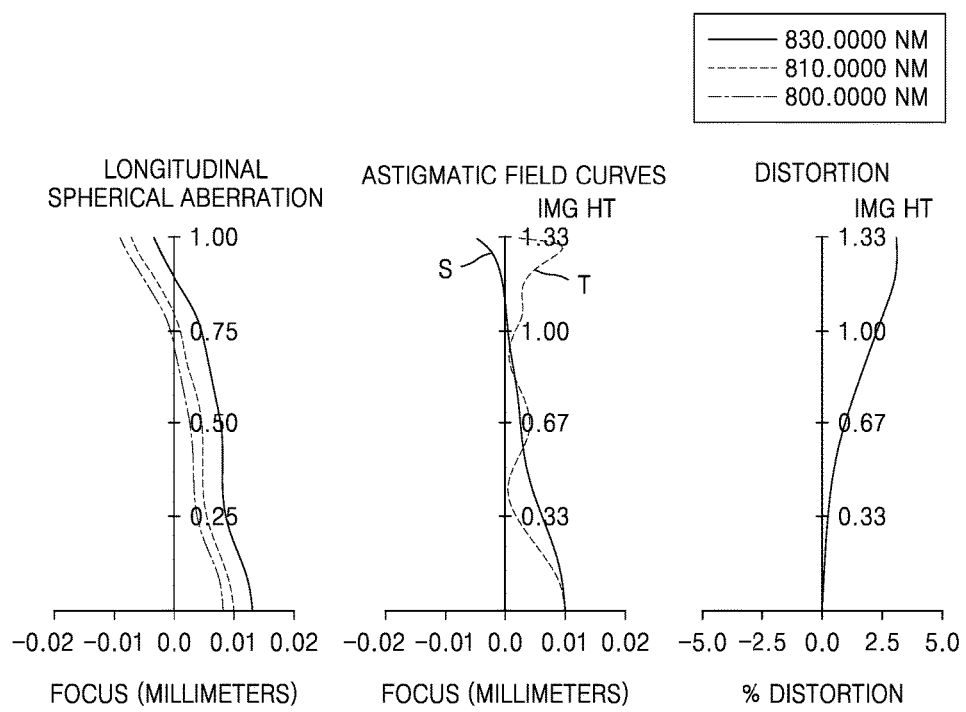
FIG. 6 is an aberration diagram of the optical lens assembly of the second numerical example of the present disclosure.

FIG. 6 shows the longitudinal spherical aberration, the astigmatic field curves, and the distortion of the optical lens assembly according to the second numerical example of the present disclosure.

THIRD NUMERICAL EXAMPLE

FIG. 7 shows an optical lens assembly of the third numerical example of the present disclosure, and Table 5 shows the design data for the third numerical example.

TABLE 5

| lens surface | R (mm) | Dn (mm) | Nd | Vd | effective diameter (mm) |
|---|---|---|---|---|---|
| ST | Infinity | −0.200 | | | 3.25 |
| 2* | 2.30 | 1.107 | 1.538 | 56.0 | 3.42 |
| 3* | 8.19 | 2.003 | | | 3.16 |
| 4* | −13.58 | 0.661 | 1.538 | 56.0 | 2.56 |
| 5* | −13.85 | 0.710 | | | 2.16 |
| 6* | −14.47 | 0.353 | 1.538 | 56.0 | 2.01 |
| 7* | 5.49 | 0.911 | | | 2.17 |
| 8 | Infinity | 0.373 | 1.516 | 54.5 | 2.42 |
| 9 | Infinity | 0.685 | | | 2.48 |
| IMH | Infinity | −0.006 | | | 2.67 |

Table 6 illustrates aspherical coefficients in the third numerical example.

TABLE 6

| aspherical coefficients | 2* | 3* | 4* | 5* | 6* | 7* |
|---|---|---|---|---|---|---|
| R | 2.295E+00 | 8.186E+00 | −1.358E+01 | −1.385E+01 | −1.447E+01 | 5.486E+00 |
| K | −8.013E−03 | 1.699E+01 | 2.510E+01 | 1.384E+02 | 7.458E+01 | −3.722E+00 |
| A | −1.410E−03 | −1.656E−03 | −8.716E−03 | −4.999E−03 | −2.223E−01 | −2.065E−01 |
| B | −1.547E−03 | 1.269E−03 | −7.397E−03 | 3.031E−02 | 1.544E−01 | 1.632E−01 |
| C | 2.261E−03 | −1.852E−03 | 4.623E−02 | 2.133E−02 | −7.494E−02 | −1.182E−01 |
| D | −1.909E−03 | 1.394E−03 | −6.831E−02 | −4.724E−02 | 6.647E−03 | 5.859E−02 |
| E | 8.825E−04 | −5.639E−04 | 4.951E−02 | 4.058E−02 | 9.562E−03 | −1.973E−02 |
| F | −2.098E−04 | 1.134E−04 | −1.824E−02 | −1.633E−02 | −6.140E−03 | 3.488E−03 |
| G | 2.054E−05 | −8.278E−06 | 2.494E−03 | 2.456E−03 | 6.083E−04 | −2.466E−04 |

Values under Conditions 1 to 7 in the third numerical example are as follows.

OAL=6.80 mm

EFL=7.0 mm

Transverse magnification (object distance 20 cm)=0.036

Transverse magnification (object distance 50 cm)=0.014 f1/EFL=0.795

1 f3/EFL 1=1.051

OAL/EFL=0.971

R1/EFL=0.189

A11/IMH=1.282

A11/A32=1.576

T13/OAL=0.496

Figure 8:
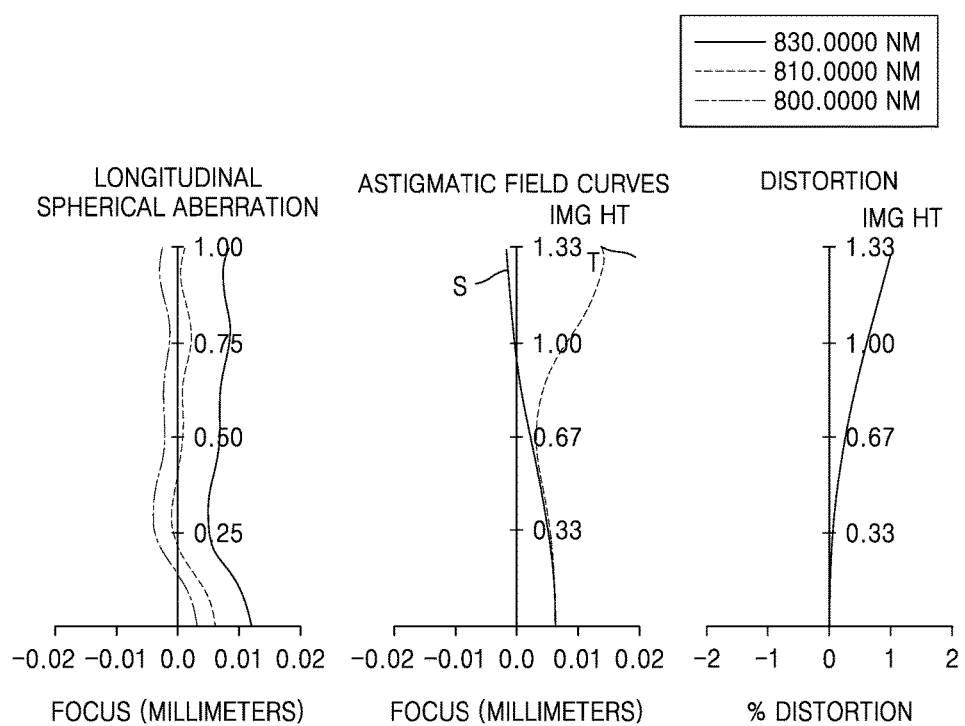
FIG. 8 is an aberration diagram of the optical lens assembly of the third numerical example of the present disclosure.

FIG. 8 shows the longitudinal spherical aberration, the astigmatic field curves, and the distortion of the optical lens assembly according to the third numerical example of the present disclosure.

FOURTH NUMERICAL EXAMPLE

FIG. 9 shows an optical lens assembly of the fourth numerical example under the present disclosure, and Table 7 shows design data for the fourth numerical example.

TABLE 7

| lens surface | R (mm) | Dn (mm) | Nd | Vd | effective diameter (mm) |
|---|---|---|---|---|---|
| ST | Infinity | −0.100 | | | 0.99 |
| 2* | 0.73 | 0.333 | 1.538 | 56.0 | 1.05 |
| 3* | 2.64 | 0.650 | | | 0.99 |
| 4* | −4.72 | 0.251 | 1.538 | 56.0 | 0.80 |
| 5* | −3.85 | 0.154 | | | 0.80 |
| 6* | −4.81 | 0.200 | 1.538 | 56.0 | 0.83 |
| 7* | 1.48 | 0.214 | | | 0.97 |
| 8 | Infinity | 0.110 | 1.516 | 54.5 | 1.07 |
| 9 | Infinity | 0.229 | | | 1.10 |
| IMH | Infinity | −0.003 | | | 1.20 |

Table 8 illustrates aspherical coefficients in the fourth numerical example.

TABLE 8

| aspherical coefficients | 2* | 3* | 4* | 5* | 6* | 7* |
|---|---|---|---|---|---|---|
| R | 7.254E−01 | 2.637E+00 | −4.715E+00 | −3.847E+00 | −4.809E+00 | 1.479E+00 |
| K | −2.414E−03 | 1.713E+01 | 3.934E+01 | 7.573E+01 | 1.030E+02 | 1.137E+00 |
| A | −3.695E−02 | −3.260E−02 | −2.103E−01 | −4.526E−01 | −6.337E+00 | −6.439E+00 |
| B | −5.032E−01 | 3.910E−01 | −2.789E+00 | 1.467E+01 | 5.499E+01 | 5.520E+01 |
| C | 7.464E+00 | −6.266E+00 | 1.553E+02 | 7.594E+01 | −2.218E+02 | −3.945E+02 |
| D | −6.387E+01 | 4.594E+01 | −2.330E+03 | −1.618E+03 | 1.278E+02 | 1.967E+03 |
| E | 2.983E+02 | −1.891E+02 | 1.676E+04 | 1.384E+04 | 3.796E+03 | −6.527E+03 |
| F | −7.206E+02 | 3.913E+02 | −6.204E+04 | −5.595E+04 | −1.637E+04 | 1.264E+04 |
| G | 7.084E+02 | −3.274E+02 | 8.649E+04 | 8.519E+04 | 2.154E+04 | −1.081E+04 |

Values under Conditions 1 to 7 in the fourth numerical example are as follows.
AL=2.14 mm
EFL=2.2 mm
Transverse magnification (object distance 20 cm)=0.011
Transverse magnification (object distance 50 cm)=0.004
f1/EFL=0.798
1 f3/EFL 1=0.946
OAL/EFL=0.972
R1/EFL=0.330
A11/IMH=0.878
A11/A32=1.090
T13/OAL=0.494

Figure 10:
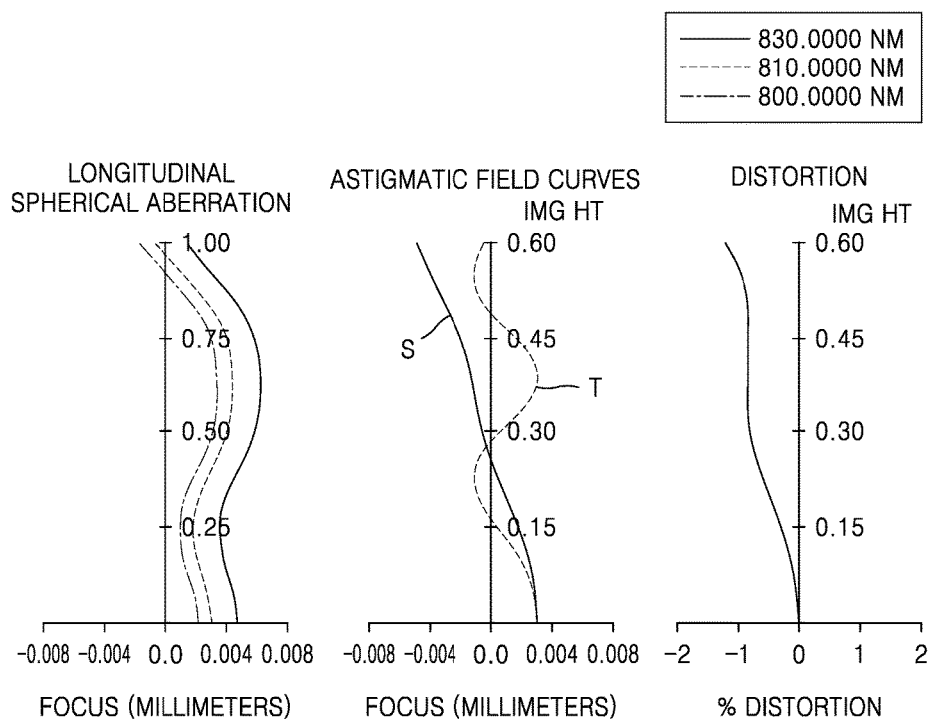
FIG. 10 is an aberration diagram of the optical lens assembly of the fourth numerical example of the present disclosure.

FIG. 10 shows the longitudinal spherical aberration, the astigmatic field curves, and the distortion of the optical lens assembly according to the fourth numerical example of the present disclosure.

FIFTH NUMERICAL EXAMPLE

FIG. 11 shows an optical lens assembly of the fifth numerical example of the present disclosure, and Table 5 shows design data for the fifth numerical example.

TABLE 9

| lens surface | R (mm) | Dn (mm) | Nd | Vd | effective diameter (mm) |
|---|---|---|---|---|---|
| ST | Infinity | −0.100 | | | 0.95 |
| 2* | 1.01 | 0.419 | 1.538 | 56.0 | 0.97 |
| 3* | 3.84 | 0.938 | | | 0.98 |
| 4* | −7.21 | 0.258 | 1.538 | 56.0 | 1.18 |
| 5* | −6.26 | 0.300 | | | 1.40 |
| 6* | −7.94 | 0.208 | 1.538 | 56.0 | 1.61 |
| 7* | 2.16 | 0.209 | | | 1.84 |
| 8 | Infinity | 0.110 | 1.516 | 54.5 | 2.08 |
| 9 | Infinity | 0.444 | | | 2.13 |
| IMH | Infinity | −0.004 | | | 2.47 |

Table 10 illustrates aspherical coefficients in the fifth numerical example.

Values under Conditions 1 to 7 in the fifth numerical example are as follows.
OAL=2.88 mm
EFL=3.0 mm
Transverse magnification (object distance 20 cm)=0.015
Transverse magnification (object distance 50 cm)=0.006
f1/EFL=0.812
1 f3/EFL 1=1.047
OAL/EFL=0.96
R1/EFL=0.338
A11/IMH=0.392
A11/A32=0.527
T13/OAL=0.519

Figure 12:
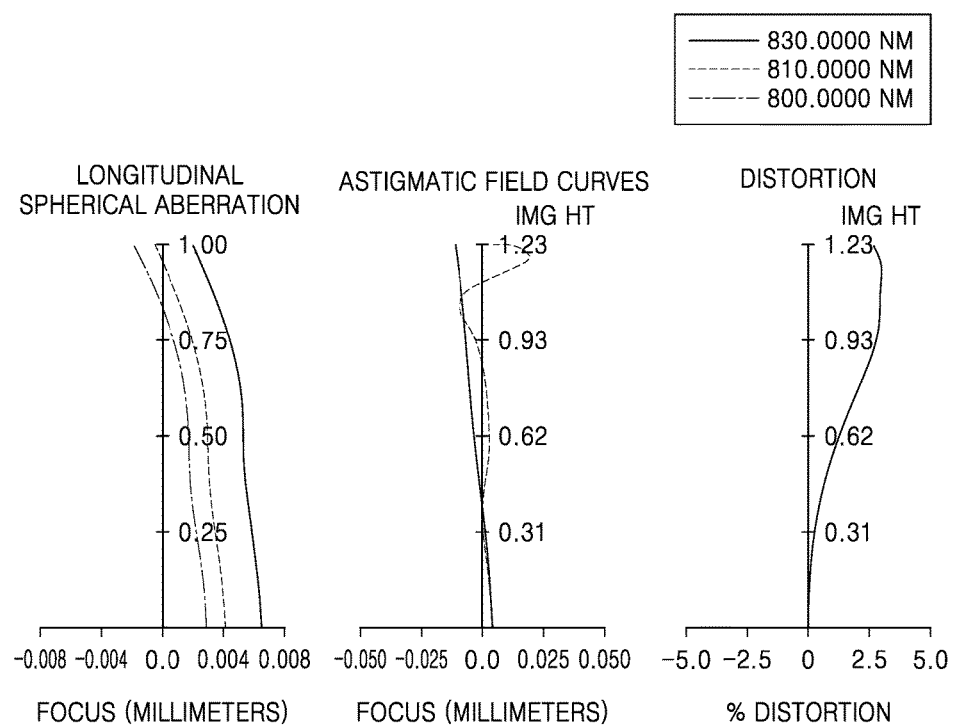
FIG. 12 is an aberration diagram of the optical lens assembly of the fifth numerical example of the present disclosure.

FIG. 12 shows the longitudinal spherical aberration, the astigmatic field curves, and the distortion of the optical lens assembly according to the fifth numerical example of the present disclosure.

The various exemplary embodiments disclose an efficient way of implementing a camera lens system for iris recognition in an electronic device. Conventionally, it may be difficult to obtain an iris image due to influence of natural light. In addition, iris recognition may be difficult when the images of the irises are insufficiently magnified. The optical lens assembly according to various exemplary embodiments may obtain high quality iris images by using a visible light cut-off filter and an infrared ray (IR) light source. In addition, the optical lens assembly according to various exemplary embodiments may use sufficient transverse magnification to ensure satisfactory iris recognition performance. Also, the size of the optical lens assembly according to various exemplary embodiments may be miniaturized for use in mobile electronic devices.

The optical lens assembly according to various exemplary embodiments may be used for various electronic devices such as electronic device with image sensors, digital cameras, cameras with replaceable lenses, video cameras, cellphone cameras, cameras for small portable mobile devices, etc.

Figure 14:
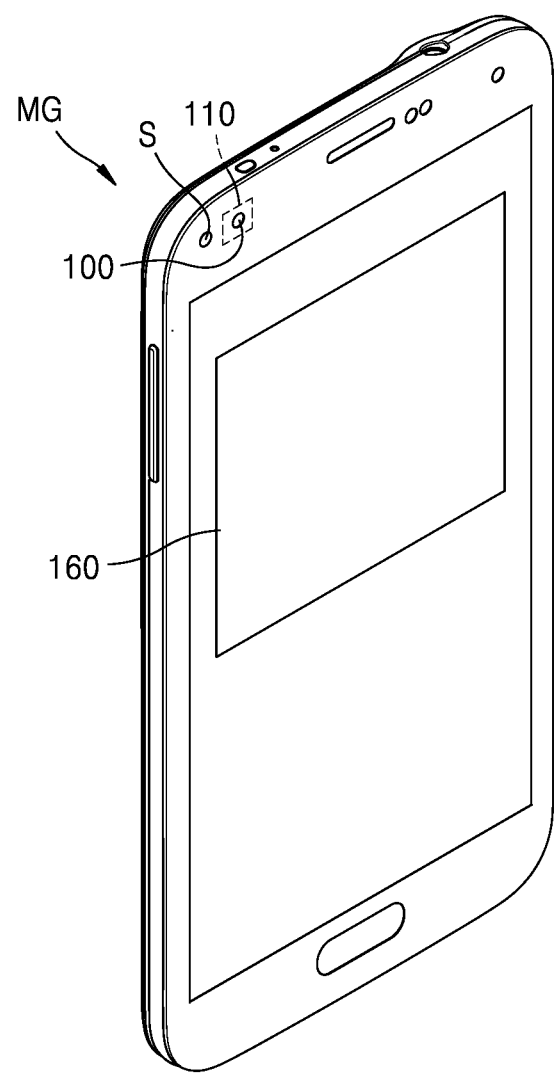
FIG. 14 is a diagram showing an example of an electronic device including an optical lens assembly according to one exemplary embodiment of the present disclosure.

FIG. 14 is a diagram showing an example of an electronic device MG including an optical lens assembly according to one embodiment of the present disclosure. FIG. 14 shows an example in which the electronic device MG is a mobile

TABLE 10

| aspherical coefficients | 2* | 3* | 4* | 5* | 6* | 7* |
|---|---|---|---|---|---|---|
| R | 1.014E+00 | 3.845E+00 | −7.210E+00 | −6.258E+00 | −7.943E+00 | 2.163E+00 |
| K | −8.289E−02 | 9.980E+00 | 9.900E+01 | 6.823E+01 | 9.484E+01 | −6.669E−01 |
| A | −2.506E−02 | −2.909E−02 | −1.996E−01 | −1.011E−01 | −1.676E+00 | −1.661E+00 |
| B | −6.853E−02 | −3.757E−02 | −3.726E−01 | 1.365E+00 | 5.766E+00 | 5.849E+00 |
| C | 2.442E−01 | −2.925E−01 | 6.220E+00 | 2.936E+00 | −9.413E+00 | −1.675E+01 |
| D | −1.257E+00 | 6.325E−01 | −4.058E+01 | −2.832E+01 | 2.279E+00 | 3.401E+01 |
| E | 1.955E+00 | −1.696E+00 | 1.171E+02 | 9.663E+01 | 2.669E+01 | −4.578E+01 |
| F | −2.341E+00 | −2.430E−01 | −1.892E+02 | −1.596E+02 | −4.669E+01 | 3.600E+01 |
| G | 3.090E+00 | 5.664E+00 | 9.989E+01 | 9.801E+01 | 2.412E+01 | −1.231E+01 | phone, but various exemplary embodiments are not limited thereto. FIG. 14 shows the front surface of the mobile phone. The electronic device MG may include at least one optical lens assembly 100, and an image sensor 110 for receiving images captured by the optical lens assembly 100 and converting the images into electric image signals. The optical lens assembly 100 may be one of the optical lens assemblies described above with reference to FIGS. 1 to 13. When the optical lens assembly according to various exemplary embodiments is used in electronic devices such as portable digital cameras, mobile phones, etc., the optical lens assembly may provide a photographing apparatus of high performance.

When iris authentication of the user is performed in the electronic device MG by using the optical lens assembly 100 according to various exemplary embodiments and the image sensor 110, a user interface 160 for guiding the user authentication may be displayed on a display screen of the electronic device MG. The electronic device MG according to various exemplary embodiments may include an IR light source S. The IR light source S may be disposed adjacent to the optical lens assembly 100. IR irradiated from the IR light source S is reflected by the irises of the user, and the reflected IR light may be focused on the image sensor 110 via the optical lens assembly 100. The electronic device MG according to various exemplary embodiments may obtain iris images precisely by using the visible light cut-off filter and the IR light source.

Figure 15:
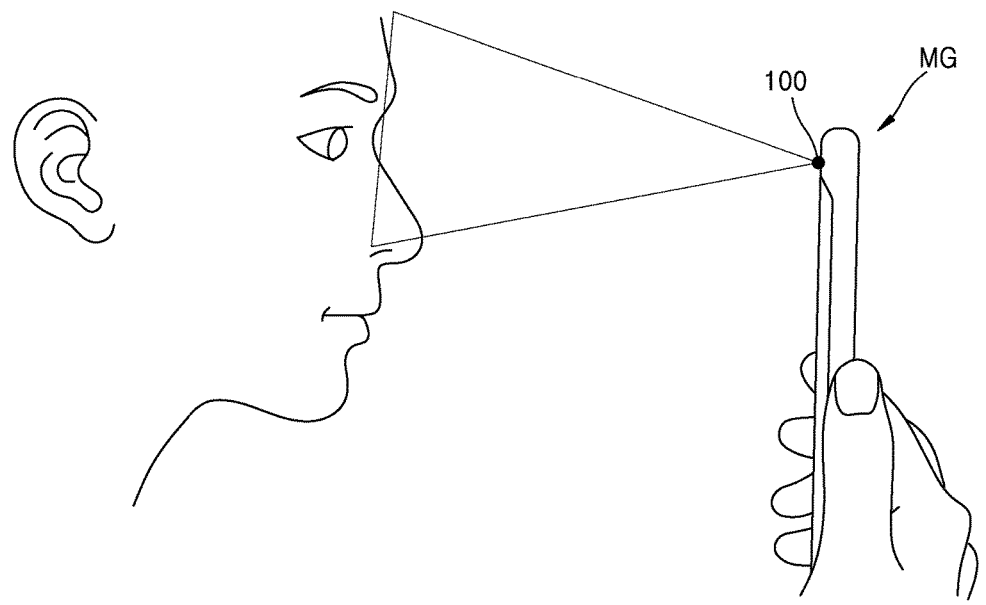
FIG. 15 is an exemplary diagram showing the use of an optical lens assembly according to one exemplary embodiment of the present disclosure.

Referring to FIG. 15, the user may be in the shown viewing angle range of the optical lens assembly 100 included in the electronic device MG, so that irises may be photographed and user authentication may be performed by the electronic device MG (e.g., a mobile device).

The image sensor 110 may include IR-sensitive pixels. IR-sensitive pixels may allow the images of irises to be captured accurately.

Figure 16:
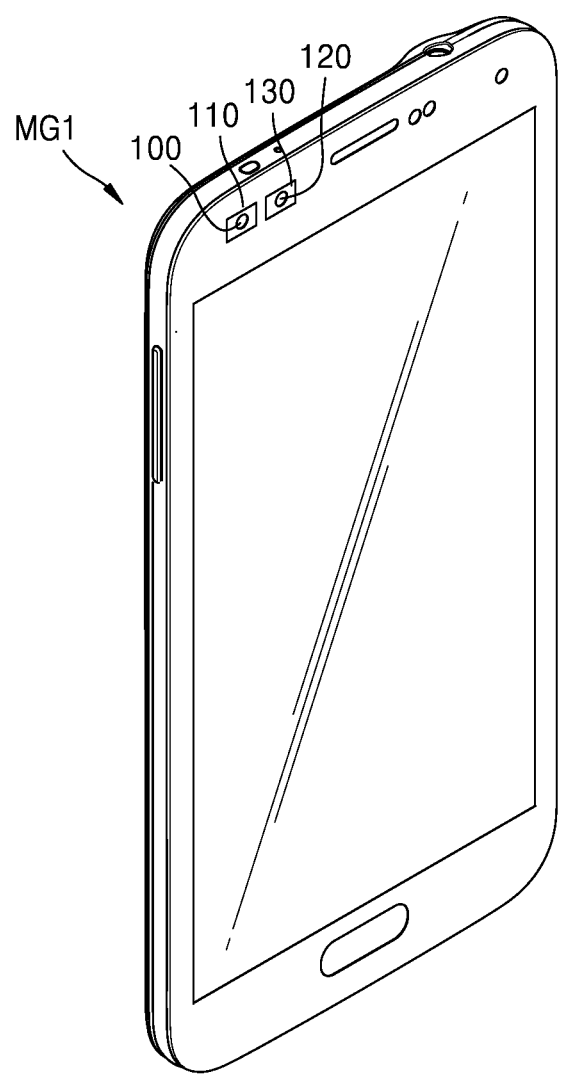
FIG. 16 is a diagram showing another example of an electronic device including an optical lens assembly according to one exemplary embodiment of the present disclosure.

FIG. 16 shows another example of an electronic device MG1 according to another exemplary embodiment. The electronic device MG1 may include an optical lens assembly 100 and another optical lens assembly 120. In addition, the electronic device MG1 may include an image sensor 110 corresponding to the optical lens assembly 100, and an image sensor 130 corresponding to the optical lens assembly 120. The optical lens assembly 100 may be used for, for example, the iris authentication, and the optical lens assembly 120 may be used to capture images of visible light.

The optical lens assembly 100 and the optical lens assembly 120 may have different viewing angles or different focal distances. For example, the optical lens assembly 100 may be a lens system for performing user iris authentication, and the optical lens assembly 120 may be a standard lens system or a wide angle lens system for taking pictures. When the user authentication is finished via the optical lens assembly 100, the user may use the electronic device MG1 and may take pictures by using the optical lens assembly 120.

Figure 17:
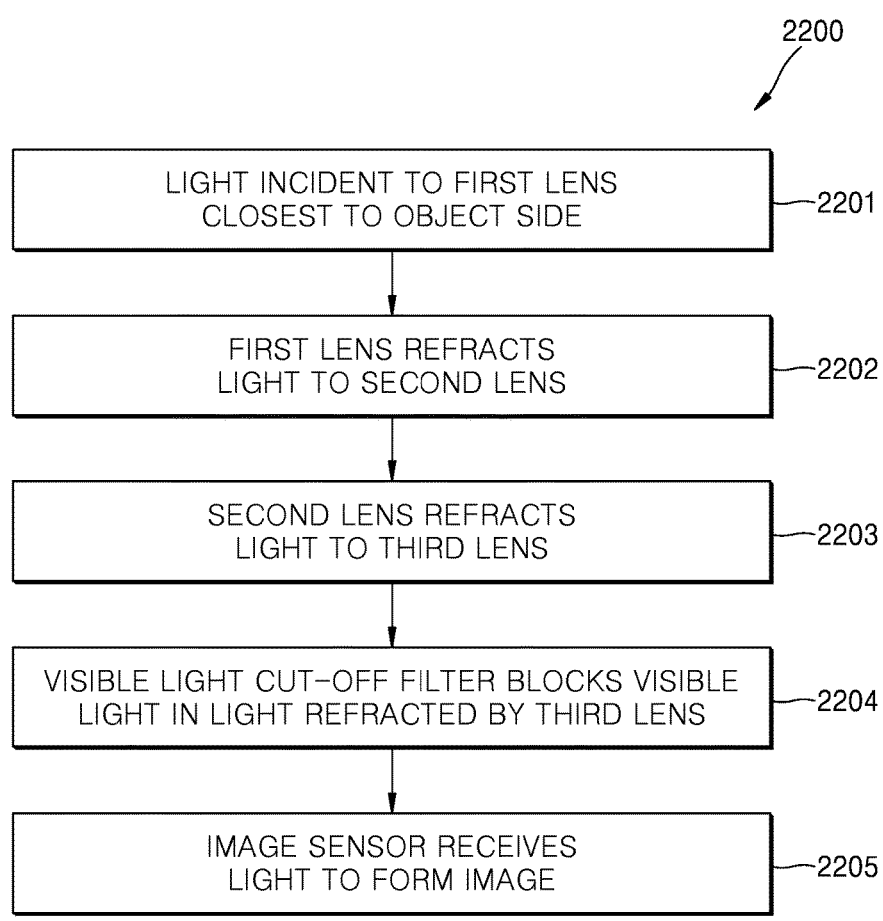
FIG. 17 is a flowchart illustrating an imaging process of an optical lens assembly according to one exemplary embodiment of the present disclosure.

FIG. 17 is a flowchart (2200) illustrating an imaging process using the optical lens assembly 100-1, 100-2, 100-3, 100-4, and 100-5 as illustrated with reference to FIGS. 1, 5, 7, 9, and 11, according to one exemplary embodiment.

According to an exemplary embodiment, in operation 2201, light is incident to a first lens L1-1, L1-2, L1-3, L1-4, or L1-5 that is the closest to the object side in the optical lens assembly 100-1, 100-2, 100-3, 100-4, or 100-5.

In operation 2202, the first lens L1-1, L1-2, L1-3, L1-4, or L1-5 may refract light to a second lens L2-1, L2-2, L2-3, L2-4, or L2-5.

In operation 2203, the second lens L2-1, L2-2, L2-3, L2-4, or L2-5 included in the optical lens assembly may refract the light to a third lens L3-1, L3-2, L3-3, L3-4, and L3-5.

In operation 2204, for example, a visible ray cut-off filter included in the optical lens assembly may block the visible ray in the light refracted through the third lens.

In operation 2205, for example, an electronic device including the optical lens assembly (e.g., an electronic device 200 of FIG. 18, or an electronic device 301 of FIG. 19) may form an image by using the light transmitted through the image sensor. For example, an image may be captured by using an image sensor (not shown) configuring at least a part of a camera module (e.g., a camera module 225 of FIG. 18 or a camera module 391 of FIG. 19) included in the electronic device.

An electronic device 201 in a network environment 200 according to various exemplary embodiments will be described below with reference to FIG. 18. The electronic device 201 may include a bus 210, a processor 220, a camera module 225, a memory 230, an input/output interface 250, a display 260, and a communication interface 270. In some embodiments, the electronic device 201 may omit at least one of the components, or may further include an additional component.

The bus 210 may include, for example, a circuit connecting the components (210 to 270) to one another and transmitting communication (e.g., a control message and/or data) among the components.

The processor 220 may include at least one of a central processing unit (CPU), an application processor (AP), and a communication processor (CP). The processor 220 may execute, for example, calculations or data processing about controlling and/or communicating among at least one another component in the electronic device 201.

The camera module 225 is, for example, a device capable of capturing still images and videos, and according to an exemplary embodiment, the camera module 225 may include one or more image sensors (e.g., a front sensor or a rear sensor), a lens, an image signal processor (ISP), or a flash (e.g., a light emitting diode (LED), a xenon lamp, etc.) Otherwise, the camera 225 may capture an image of irises of the user for user authentication. For example, the optical lens assembly according to various exemplary embodiments may be applied to the camera module 225.

The memory 230 may include a volatile and/or non-volatile memory. The memory 230 may store, for example, instructions or data regarding at least one another component in the electronic device 201. According to one exemplary embodiment, the memory 230 may store software and/or a program 240. The program 240 may include, for example, a kernel 241, middleware 243, an application programming interface (API) 245, and/or an application program (or "application") 247, etc. At least some of the kernel 241, the middleware 243, or the API 245 may be referred to as an operating system (OS).

The kernel 241 may control or manage system resources (e.g., the bus 210, the processor 220, the memory 230, etc.) used to execute operations or functions implemented in other programs (e.g., the middleware 243, the API 245, or the application program 247). Also, the kernel 241 may provide an interface capable of controlling or managing the system resources, by accessing individual component of the electronic device 201 from the middleware 243, the API 245, or the application program 247.

The middleware 243 may perform mediation function so that, for example, the API 245 or the application program 247 may communicate with the kernel 241 and exchange data.

In addition, the middleware 243 may process one or more operation requests transmitted from the application program 247 according to a priority order. For example, the middleware 143 may grant to at least one of the application program 247 a priority order of using the system resources (e.g., the bus 210, the processor 220, or the memory 230) of the electronic device 201. For example, the middleware 243 processes the one or more operation requests according to the priority order granted to the at least one application program 247, thereby performing scheduling or load balancing of the one or more operation requests.

The API 245 is, for example, an interface for the application 247 to control the functions provided by the kernel 241 or the middleware 243, and may include at least one interface or function (e.g., instruction), for example, for file control, window control, image processing, or text control.

The input/output interface 250 may function as, for example, an interface capable of transmitting instruction or data input from the user or another external device to the other component(s) of the electronic device 201. In addition, the input/output interface 250 may output instruction or data transmitted from the other component(s) of the electronic device 201 to the user or another external device.

The display 260 may include, for example, a liquid crystal display (LCD), a light-emitting diode (LED) display, an organic light-emitting diode (OLED) display, a microelectromechanical systems (MEMS) display, or an electronic paper display. The display 260 may display, for example, various pieces of content (e.g., text, images, videos, icons, or symbols) to the user. The display 260 may include a touch screen, and may receive, for example, a touch input, a gesture input, a proximity input, or a hovering input via an electronic pen or a part of a body of the user.

The communication interface 270 may set communications between, for example, the electronic device 201 and an external device (e.g., a first external electronic device 202, a second external electronic device 204, or a server 206). For example, the communication interface 270 is connected to a network 262 via wireless communication or wires communication to communicate with an external device (e.g., the second external electronic device 204 or the server 206).

The wireless communication may use a cellular communication protocol, for example, at least one of long-term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM). Also, the wireless communication may include, for example, near distance communication 264. The near distance communication 264 may include, for example, at least one of wireless fidelity (WiFi), Bluetooth, near field communication (NFC), and global navigation satellite system (GNSS). GNSS may include, for example, at least one of global positioning system (GPS), global navigation satellite system (Glonass), Beidou navigation satellite system (Beidou) or Galileo, and the European global satellite-based navigation system, according to used region or bandwidth. Hereinafter, in the present specification, GPS and GNSS may be interchangeably used. The wires communication may include, for example, at least one of universal serial bus (USB), high definition multimedia interface (HDMI), recommended standard-232 (RS-232), and plain old telephone service (POTS). The network 262 may include telecommunications network, for example, at least one of computer network (e.g., LAN or WAN), Internet, and telephone network.

The first and second external electronic devices 202 and 204 may each be a device of the same kind as or different from the electronic device 201. According to one embodiment, the server 206 may include a group of one or more servers. According to various exemplary embodiments, all or some of operations performed in the electronic device 201 may be executed in one or more other electronic devices (e.g., the external electronic devices 202 and 204), or the server 206. According to one exemplary embodiment, in a case where the electronic device 201 has to perform a certain function or service automatically or upon request, the electronic device 201 may request another device (e.g., the external electronic devices 202 and 204, or the server 206) to perform at least some functions related to the certain function or service, instead of or additionally to the executing of the certain function or service on its own. The electronic device (e.g., the external electronic device 202 and 204, or the server 206) may execute requested function or the additional function, and may transfer a result of execution to the electronic device 201. The electronic device 201 may provide requested function or service after processing or without processing the result. To do this, for example, a cloud computing, a distributed computing, or a client-server computing technique.

Figure 18:
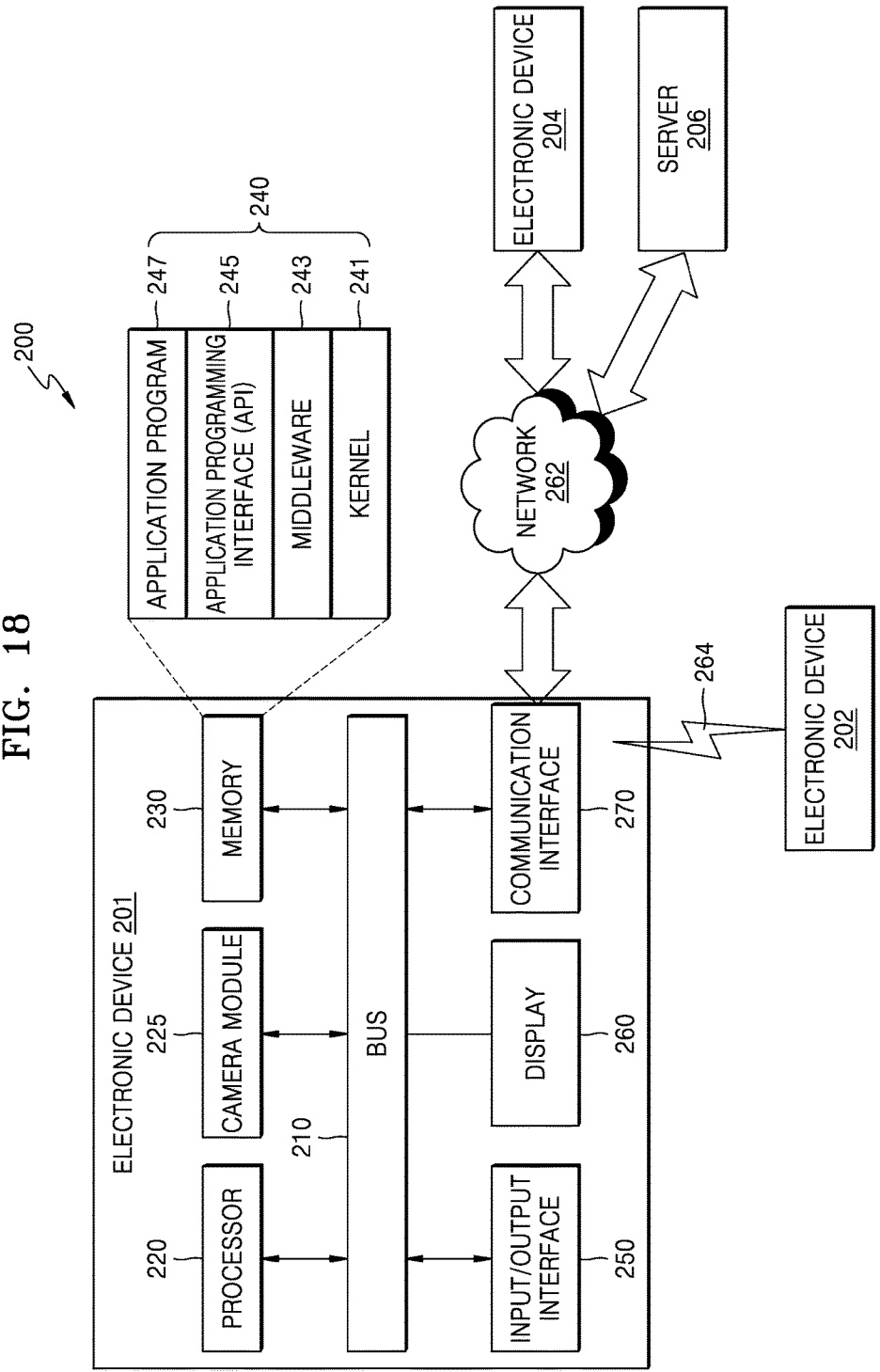
FIG. 18 is a diagram of a network environment according to one exemplary embodiment of the present disclosure.
Figure 19:
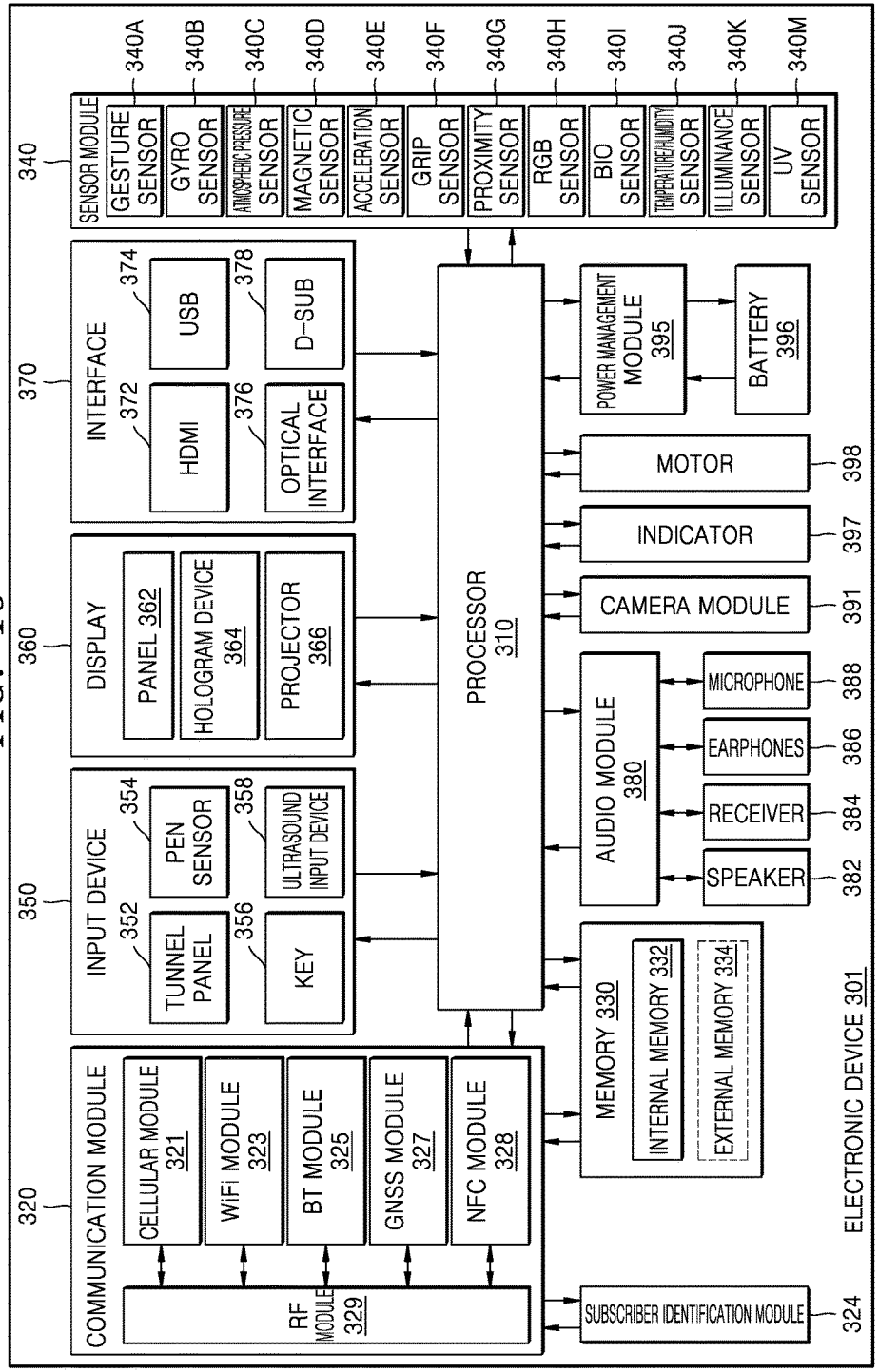
FIG. 19 is a block diagram of an electronic device according to one exemplary embodiment of the present disclosure.

FIG. 19 is a block diagram of an electronic device 301 according to one exemplary embodiment. The electronic device 301 may include, for example, whole or some parts of the electronic device 201 illustrated in FIG. 18. The electronic device 301 may include one or more processors (e.g., an application processor (AP)) 310, a communication module 320 (a subscriber identification module 324), a memory 330, a sensor module 340, an input device 350, a display 360, an interface 370, an audio module 380, a camera module 391, a power management module 395, a battery 396, an indicator 397, and a motor 398.

The processor 310 may drive, for example, an operating system or an application program to control a plurality of hardware or software components connected to the processor 310, and may perform various data processing and calculation. The processor 310 may be implemented as, for example, a system on chip (SOC). According to one exemplary embodiment, the processor 310 may further include a graphic processing unit (GPU) and/or an image signal processor. The processor 310 may include at least some (e.g., a cellular module 321) of the components illustrated in FIG. 18. The processor 310 may load the instruction or data transmitted from at least one of the other components (e.g., non-volatile memory) on a volatile memory to process the instruction or data, and may store various data in the non-volatile memory.

The communication module 320 may have a structure that is the same as or similar to that of the communication interface 270 of FIG. 18. The communication module 320 may include, for example, a cellular module 321, a WiFi module 323, a Bluetooth module 325, a GNSS module 327 (e.g., a GPS module, a Glonass module, a Beidou module, or a Galileo module), an NFC module 328, and a radio frequency (RF) module 329.

The cellular module 321 may provide, for example, voice call service, video call service, text message service, or Internet service via a communication network. According to one exemplary embodiment, the cellular module 321 may perform discrimination and authentication of the electronic device 301 within the communication network by using the subscriber identification module (e.g., a SIM card) 324. According to one exemplary embodiment, the cellular module 321 may perform at least some of the functions that may be provided by the processor 310. According to one exemplary embodiment, the cellular module 321 may include a communication processor (CP).

Each of the WiFi module 323, the Bluetooth module 325, the GNSS module 327, and the NFC module 328 may include a processor for processing data transmitted/received through the corresponding module. According to one exemplary embodiment, at least some (e.g., two or more) of the cellular module 321, the WiFi module 323, the Bluetooth module 325, the GNSS module 327, and the NFC module 328 may be included in one integrated chip (IC) or an IC package.

The RF module 329 may transmit/receive, for example, a communication signal (e.g., an RF signal). The RF module 329 may include, for example, a transceiver, a power amp module (PAM), a frequency filter, a low noise amplifier (LNA), or an antenna. According to another exemplary embodiment, at least one of the cellular module 221, the WiFi module 323, the Bluetooth module 325, the GNSS module 327, and the NFC module 328 may transmit/receive an RF signal via an additional RF module.

The subscriber identification module 324 may include, for example, a card including the subscriber identification module and/or an embedded SIM, and may include unique identification information (e.g., integrated circuit card identifier (ICCID)) or subscriber information (e.g., international mobile subscriber identity (IMSI)).

The memory 330 may include, for example, an internal memory 332 or an external memory 334. The internal memory 332 may include, for example, at least one of a volatile memory (e.g., dynamic RAM (DRAM), static RAM (SRAM), synchronous dynamic RAM (SDRAM), etc.), a non-volatile memory (e.g., one time programmable ROM (OTPROM), programmable ROM (PROM), an erasable and programmable ROM (EPROM), an electrically erasable and programmable ROM (EEPROM), a mask ROM, a flash ROM, a flash memory (e.g., NAND flash, NOR flash, etc.), hard drive, or solid state drive (SSD).

The external memory 334 may further include a flash drive, for example, a compact flash (CF), secure digital (SD), micro-SD, Mini-SD, extreme digital (xD), a multi-media card (MMD), a memory stick, etc. The external memory 334 may be functionally and/or physically connected to the electronic device 301 via various interfaces.

The sensor module 340 may measure a physical amount or sense an operating state of the electronic device 301, so as to convert measured or sensed information into an electric signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, blue (RGB) sensor), a bio sensor 340I, a temperature/humidity sensor 340J, an illuminance sensor 340K, and an ultra violet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may include a control circuit for controlling at least one sensor included therein. In some embodiments, the electronic device 301 may further include a processor configured to control the sensor module 340 as a part of the processor 310 or separately, so as to control the sensor module 340 while the processor 310 is in a sleep state.

The input device 350 may include, for example, a touch panel 352, a (digital) pen sensor 354, a key 356, or an ultrasonic input device 358. The touch panel 352 may use at least one of, for example, a capacitive type, a pressure sensitive type, an IR type, and an ultrasound type touch screen. Also, the touch panel 352 may further include a control circuit. The touch panel 352 may further include a tactile layer to provide a user with a tactile reaction.

The (digital) pen sensor 354 may be, for example, a part of the touch panel 352, or may include an additional recognition sheet. The key 356 may include, for example, a physical button, an optical key, or a keypad. The ultrasound input device 358 may sense ultrasound wave generated from an input device via a microphone (e.g., a microphone 388) to identify data corresponding to the ultrasound wave.

The display 360 (e.g., the display 360) may include a panel 362, a hologram device 364, or a projector 366. The panel 362 may have a structure that is the same as or similar to that of the display 260 shown in FIG. 18. The panel 362 may be configured to be, for example, flexible, transparent, or wearable. The panel 362 may be configured as one module with the touch panel 352. According to one exemplary embodiment, the panel 362 may include a pressure sensor (or a force sensor) capable of measuring an intensity of a pressure from a touch of the user. The pressure sensor may be provided integrally with the touch panel 352, or may be provided as one or more additional sensors separately from the touch panel 352. The hologram device 364 may show a stereoscopic image in the air by using interference of light. The projector 366 may display images by projecting light onto a screen. The screen may be located, for example, inside or outside the electronic device 301. According to one exemplary embodiment, the display 360 may further include a control circuit for controlling the panel 362, the hologram device 364, or the projector 366.

The interface 370 may include, for example, an HDMI 372, a universal serial bus (USB) 374, an optical interface 376, or a D-subminiature (D-sub) 378. The interface 370 may be included, for example, in the communication interface 370 shown in FIG. 19. Additionally or alternatively, the interface 370 may include, for example, a mobile high-definition link (MHL) interface, a secure digital (SD) card/multi-media card (MMC) interface, or infrared data association (IrDA) standard interface.

The audio module 380 may bi-directionally convert sound and electric signals to each other. At least some of components of the audio module 380 may be included in, for example, an input/output interface 250 shown in FIG. 18. The audio module 380 may process sound information input or output through, for example, a speaker 382, a receiver 384, earphones 386, or a microphone 388.

The camera module 391 is, for example, a device capable of capturing still images and videos, and according to an exemplary embodiment, the camera module 225 may include one or more image sensors (e.g., a front sensor or a rear sensor), a lens, an image signal processor (ISP), or a flash (e.g., a light emitting diode (LED), a xenon lamp, etc.) For example, the optical lens assembly according to various exemplary embodiments may be applied to the camera module 391.

The power management module 395 may manage power of the electronic device 301. The electronic device 301 may be an electronic device receiving power supply from a battery, but is not limited thereto. According to one exemplary embodiment, the power management module 395 may include a power management integrated circuit (PMIC), a charger IC, or a battery or fuel gauge. The PMIC may be charged through wires and/or wirelessly. The wireless charging method may include, for example, a magnetic resonance method, a magnetic induction method, or an electromagnetic wave method, and an additional circuit for wireless charging, for example, a coil loop, a resonant circuit, or a rectifier may be further provided. The battery gauge may measure, for example, a remaining capacity of the battery 396, a voltage, a current, or a temperature during the charging. The battery 396 may include, for example, a rechargeable battery and/or a solar battery.

The indicator 397 may display a certain state of the electronic device 301 or a part of the electronic device 301 (e.g., the processor 310), for example, a booting state, a message state, or a charging state. The motor 398 may convert an electric signal into mechanical vibration, and may generate vibration effect or haptic effect. Although not shown in the drawing, the electronic device 301 may include a processing device (e.g., GPU) for supporting mobile TV function. The processing device for supporting the mobile TV may process media data according to standard such as digital multimedia broadcasting (DMB), digital video broadcasting (DVB), or mediaFlo™.

The optical lens assembly according to one exemplary embodiment includes a first lens having a positive refractive power, a second lens having a positive or negative refractive power, and a third lens having a negative refractive power, wherein the first lens, the second lens, and the third lens are sequentially arranged from an object side to an image side of an optical axis, the object side facing an object for image capture and the image side facing an image plane of an image sensor, and may satisfy the following condition:

$$0.7 \leq OAL/EFL \leq 1.2$$

Here, OAL denotes an entire length of the optical lens assembly, and EFL denotes an effective focal distance.

For example, the optical lens assembly may satisfy the following condition:

$$0.5 \leq A11/A32 \leq 1.1$$

Here, A11 denotes an effective size of the object side surface of the first lens, and A32 denotes an effective size of the image side surface of the third lens.

For example, the optical lens assembly may satisfy the following condition:

$$0.39 \leq A11/IMH \leq 1.28$$

Here, A11 denotes the effective size of the object side surface of the first lens, and IMH denotes an image height.

For example, the optical lens assembly may have the entire length OAL ranging from 2.1 mm to 6.8 mm.

For example, the optical lens assembly may have the focal distance EFL ranging from 2.2 mm to 7.0 mm.

For example, the optical lens assembly may have a transverse magnification 0.01 to 0.4 at an object distance of 20 cm.

For example, the optical lens assembly may have a transverse magnification 0.004 to 0.015 at an object distance of 50 cm.

For example, the optical lens assembly may satisfy the following condition:

$$0.75 \leq f1/EFL \leq 0.9$$

$$0.7 \leq 1\ f3/EFL\ 1 \leq 1.1$$

Here, f1 denotes a focal distance of the first lens, f3 denotes a focal distance of the third lens, and EFL denotes the focal distance of the optical lens assembly.

For example, the optical lens assembly may satisfy the following condition:

$$0.19 \leq R1/OAL \leq 0.36$$

Here, R1 denotes a radius of curvature of the object side surface of the first lens, and OAL denotes the entire distance of the optical lens assembly.

For example, the optical lens assembly may satisfy the following condition:

$$0.4 \leq T13/OAL \leq 0.8$$

Here, T13 denotes a distance from an object side surface of the first lens to an image side surface of the third lens.

For example, the first lens may be a meniscus lens that is convex towards the object side.

For example, an aperture stop may be further disposed on the object side surface of the first lens.

For example, a visible light cut-off filter may be further provided between the third lens and the image sensor.

The optical lens assembly according to one exemplary embodiment may include a first lens, a second lens, a third lens, and a visible light cut-off filter, where the first lens, the second lens, and the third lens are sequentially arranged from an object side to an image side of an optical axis, the object side facing an object for image capture and the image side facing an image plane of an image sensor. The optical lens assembly may satisfy the following condition:

$$0.4 \leq T13/OAL \leq 0.8$$

Here, T13 denotes a distance from an object side surface of the first lens to an image side surface of the third lens, and OAL denotes an entire length of the optical lens assembly.

An electronic device according to one exemplary embodiment may include an optical lens assembly configured to focus an image of an object, and an image sensor configured to receive light focused by the optical lens assembly. The optical lens assembly includes a first lens having a positive refractive power, a second lens having a positive or negative refractive power, and a third lens having a negative refractive power, the first lens, the second lens, and the third lens are sequentially arranged from an object side to an image side of an optical axis, the object side facing an object for image capture and the image side facing an image plane of an image sensor. The optical lens assembly may satisfy the following condition:

$$0.7 \leq OAL/EFL \leq 1.2$$

Here, OAL denotes an entire length of the optical lens assembly, and EFL denotes an effective focal distance.

Each of the aforementioned components of the electronic device may include one or more parts, and the names of the parts may vary depending on the type of the electronic device. The electronic device in accordance with various exemplary embodiments may include at least one of the aforementioned components, omit some of them, or include other additional components. Some of the components may be combined into an integrated entity, but the entity may perform the same functions as the components.

The term "module" used herein may refer to a unit including one of hardware, software, and firmware, or a combination thereof. The term "module" may be interchangeably used with a unit, logic, logical block, component, or circuit. The "module" may be a standalone unit or part of an integrated component. The "module" may be implemented mechanically or electronically. For example, the "module" may include at least one of application specific integrated circuit (ASIC) chips, field programmable gate arrays (FPGAs), or programmable logic arrays (PLAs) that perform some operations, which have already been known or will be developed in the future.

According to an exemplary embodiment, at least a part of the device (e.g., modules or their functions) or method (e.g., operations) may be implemented as instructions stored in a computer-readable storage medium e.g., in the form of a program module. The instructions, when executed by a processor (e.g., the processor 220 of FIG. 18), may enable the processor to carry out a corresponding function. The computer-readable storage medium may be e.g., the memory 230.

The computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, or the like. Examples of the program instructions may include not only machine language codes but also high-level language codes which are executable by various computing means by using an interpreter. The aforementioned hardware devices may be configured to operate as one or more software modules to carry out exemplary embodiments, and vice versa. Modules or programming modules in accordance with various exemplary embodiments may include at least one or more of the aforementioned components, omit some of them, or further include other additional components. Operations performed by modules, programming modules or other components in accordance with various exemplary embodiments may be carried out sequentially, simultaneously, repeatedly, or heuristically. Furthermore, some of the operations may be performed in a different order, or omitted, or include other additional operation(s).

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An optical lens assembly consisting of:
   a first lens having a positive refractive power;
   a second lens having a positive or negative refractive power;
   a third lens having a negative refractive power, comprising an image side surface that is concave toward an image side of an optical axis in a region adjacent to the optical axis and has at least one inflection point; and
   an aperture stop disposed on an object side surface of the first lens,
   wherein:
   the aperture stop, the first lens, the second lens, and the third lens are sequentially arranged from an object side to the image side of the optical axis, the object side facing an object for image capture and the image side facing an image plane of an image sensor, the third lens is arranged closest to the image plane, and
   the optical lens assembly satisfies following condition:

$0.7 \leq OAL/EFL \leq 1.2$, $0.39 \leq A11/IMH \leq 1.28$, wherein OAL denotes an entire length of the optical lens assembly, EFL denotes an effective focal distance of the optical lens assembly, A11 denotes an effective size of the object side surface of the first lens, and IMH denotes an image height.

2. The optical lens assembly of claim 1, wherein the optical lens assembly further satisfies following condition:

$0.5 \leq A11/A32 \leq 1.1$, wherein A11 denotes an effective size of an object side surface of the first lens, and A32 denotes an effective size of an image side surface of the third lens.

3. The optical lens assembly of claim 1, wherein the optical lens assembly further satisfies following condition:

$0.39 \leq A11/IMH \leq 1.28$, wherein A11 denotes an effective size of an object side surface of the first lens, and IMH denotes an image height.

4. The optical lens assembly of claim 1, wherein the OAL of the optical lens assembly ranges from 2.1 mm to 6.8 mm.

5. The optical lens assembly of claim 1, wherein the EFL of the optical lens assembly ranges from 2.2 mm to 7.0 mm.

6. The optical lens assembly of claim 1, wherein the optical lens assembly has a transverse magnification ranging from 0.01 to 0.4 at an object distance of 20 cm.

7. The optical lens assembly of claim 1, wherein the optical lens assembly has a transverse magnification ranging from 0.004 to 0.015 at an object distance of 50 cm.

8. The optical lens assembly of claim 1, wherein the optical lens assembly further satisfies following conditions:

$0.75 \leq f1/EFL \leq 0.9$ $0.7 \leq |f3|/EFL 1 \leq 1.1$, wherein f1 denotes a focal distance of the first lens, and f3 denotes a focal distance of the third lens.

9. The optical lens assembly of claim 1, wherein the optical lens assembly satisfies the following condition $0.19 \leq R1/OAL \leq 0.36$, wherein R1 denotes a radius of curvature of an object side surface of the first lens.

10. The optical lens assembly of claim 1, wherein the optical lens assembly satisfies the following condition $0.4 \leq T13/OAL \leq 0.8$, where T13 denotes a distance from an object side surface of the first lens to an image side surface of the third lens.

11. The optical lens assembly of claim 1, wherein the first lens is a meniscus lens that is convex towards the object side.

12. An optical lens assembly consisting of:
    a first lens;
    a second lens;
    a third lens comprising an image side surface that is concave toward an image side of an optical axis in a region adjacent to the optical axis and has at least one inflection point;
    a visible light cut-off filter; and
    an aperture stop disposed on an object side surface of the first lens,
    wherein:
    the aperture stop, the first lens, the second lens, the third lens, and the visible light cut-off filter are sequentially arranged from an object side to the image side of the optical axis, the object side facing an object for image capture and the image side facing an image plane of an image sensor, the third lens is arranged closest to the image plane, and
    the optical lens assembly satisfies following condition:

$0.49 \leq T13/OAL \leq 0.7$, $0.39 \leq A11/IMH \leq 1.28$, wherein T13 denotes a distance from an object side surface of the first lens to an image side surface of the third lens, OAL denotes an entire length of the optical lens assembly, A11 denotes an effective size of the object side surface of the first lens, and IMH denotes an image height.

13. The optical lens assembly of claim 12, wherein the OAL of the optical lens assembly ranges from 2.1 mm to 6.8 mm.

14. The optical lens assembly of claim 12, wherein an effective focal distance of the optical lens assembly ranges from 2.2 mm to 7.0 mm.

15. The optical lens assembly of claim 12, wherein the optical lens assembly has a transverse magnification ranging from 0.01 to 0.4 at an object distance of 20 cm.

16. An electronic device comprising:
    an optical lens assembly configured to focus an image of an object; and
    an image sensor configured to receive light focused by the optical lens assembly,
    wherein the optical lens assembly consists of a first lens having a positive refractive power, a second lens having a positive or negative refractive power, a third lens having a negative refractive power, comprising an image side surface that is concave toward an image side of an optical axis in a region adjacent to the optical axis, and has at least one inflection point, and an aperture stop disposed on an object side surface of the first lens,
    wherein the aperture stop, the first lens, the second lens, and the third lens are sequentially arranged from an object side to an image side of an optical axis, the object side facing an object for image capture and the image side facing an image plane of an image sensor,
    wherein the third lens is arranged closest to the image plane, and
    wherein the optical lens assembly satisfies following condition:

$0.7 \leq OAL/EFL \leq 1.2$, $0.39 \leq A11/IMH \leq 1.28$, where OAL denotes an entire length of the optical lens assembly, EFL denotes an effective focal distance of the optical lens assembly, A11 denotes an effective size of the object side surface of the first lens, and IMH denotes an image height.

* * * * *